US012640898B2

(12) United States Patent
Abdelghaffar et al.

(10) Patent No.: US 12,640,898 B2
(45) Date of Patent: May 26, 2026

(54) PRIORITY AND COLLISION HANDLING BETWEEN SEMI-STATIC AND/OR DYNAMIC GRANT UPLINK/DOWNLINK FOR FULL DUPLEX USER EQUIPMENT

(71) Applicant: QUALCOMM Incorporated, San Diego, CA (US)

(72) Inventors: Muhammad Sayed Khairy Abdelghaffar, San Jose, CA (US); Seyedkianoush Hosseini, San Diego, CA (US); Huilin Xu, Temecula, CA (US); Ahmed Attia Abotabl, San Diego, CA (US); Abdelrahman Mohamed Ahmed Mohamed Ibrahim, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 791 days.

(21) Appl. No.: 17/448,022

(22) Filed: Sep. 17, 2021

(65) Prior Publication Data

US 2023/0088996 A1     Mar. 23, 2023

(51) Int. Cl.
    H04W 56/00     (2009.01)
    H04L 5/14     (2006.01)
    (Continued)

(52) U.S. Cl.
    CPC ....... H04L 5/1461 (2013.01); H04W 72/0446 (2013.01); H04W 72/569 (2023.01); H04W 88/06 (2013.01)

(58) Field of Classification Search
    CPC ... H04L 5/1461; H04L 5/0073; H04L 5/1469; H04W 72/569; H04W 72/0446; H04W 88/06
    (Continued)

(56) References Cited

U.S. PATENT DOCUMENTS

2014/0342738 A1* 11/2014 Ishii ...................... H04W 36/22
                                                              455/436
2015/0049653 A1* 2/2015 Baghel .................... H04L 5/001
                                                              370/280
(Continued)

FOREIGN PATENT DOCUMENTS

WO     WO-2015034299 A1 * 3/2015     ............ H04W 72/56

OTHER PUBLICATIONS

"담, Techniques for Performing Half/Full-Duplex Operations in Wireless Communications, Aug. 1, 2019, KR 102006530" (Year: 2015).*

(Continued)

*Primary Examiner* — John A Follansbee
(74) *Attorney, Agent, or Firm* — QUALCOMM Incorporated

(57)     ABSTRACT

Various aspects of the present disclosure generally relate to wireless communication. In some aspects, a user equipment (UE) may receive a first configuration to receive a downlink communication in a set of symbols of a slot via a first duplex mode, wherein the slot is configured as a flexible or a full duplex slot. The UE may receive a second configuration to transmit an uplink communication in the set of symbols via a second, different duplex mode. At least one of the first duplex mode or the second duplex mode may be a half duplex mode. The UE may, based at least in part on a set of collision mitigation rules, receive the downlink communication in the set of symbols of the slot and/or may transmit the uplink communication in set of symbols of the slot. Numerous other aspects are described.

30 Claims, 17 Drawing Sheets

(51) Int. Cl.
*H04W 72/0446* (2023.01)
*H04W 72/566* (2023.01)
*H04W 88/06* (2009.01)

(58) Field of Classification Search
USPC ........................................................ 370/278
See application file for complete search history.

(56) References Cited

U.S. PATENT DOCUMENTS

| | | | |
|---|---|---|---|
| 2018/0352582 A1 | 12/2018 | Yi et al. | |
| 2019/0068355 A1* | 2/2019 | Ode | H04W 72/0446 |
| 2022/0311478 A1* | 9/2022 | Sun | H04B 7/0695 |
| 2023/0179391 A1* | 6/2023 | He | H04W 72/0446 |
| | | | 370/235 |
| 2023/0284206 A1* | 9/2023 | Hoang | H04W 72/1263 |
| | | | 370/329 |
| 2024/0080878 A1* | 3/2024 | Kittichokechai | H04W 72/11 |

OTHER PUBLICATIONS

"Gurbuz, Synchronized-Contention Window Full-Duplex Mac Protocol for Enabling Full-Duplex Communication in Wireless Local Area Network, Aug. 10, 2017, WO 2017135908" (Year: 2016).*

"Device For Use in User Equipment, Mar. 18, 2022, CN114205917" (Year: 2021).*
Mediatek Inc: "On Half Duplex Operation for RedCap UEs", 3GPP TSG RAN WG1 Meeting #104bis-e, R1-2102701, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 7, 2021, XP052177706, pp. 1-2, paragraph [0002].
Partial International Search Report—PCT/US2022/076154—ISA/EPO—Jan. 3, 2023.
Qualcomm Incorporated: "Type-A HD-FDD for RedCap UE", 3GPP TSG-RAN WG1 Meeting #105, R1-2104679, 3rd Generation Partnership Project, Mobile Competence Centre, 650, Route Des Lucioles, F-06921 Sophia-Antipolis Cedex, France, vol. Ran WG1, No. e-Meeting, May 10-27, 2021, May 27, 2021, XP052010930, Sections 2-5, paragraph [0004], pp. 1-11.
SONY: "Half-Duplex FDD Operation for Redcap UEs", 3GPP TSG RAN WG1#104bis_e, R1-2103309, 3rd Generation Partnership Project (3GPP), Mobile Competence Centre, 650, Route Des Lucioles, F-06921 Sophia-Antipolis Cedex, France, vol. RAN WG1, No. E-meeting, Apr. 12, 2021-Apr. 20, 2021, Apr. 7, 2021, 4 Pages, XP052178076, p. 3-p. 4, paragraph [0003].
International Search Report and Written Opinion—PCT/US2022/076154—ISA/EPO—Feb. 24, 2023.

* cited by examiner

FDD

TDD (Half Duplex)

Full Duplex (in-band full duplex)

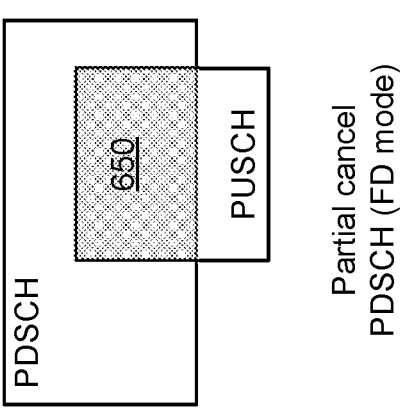
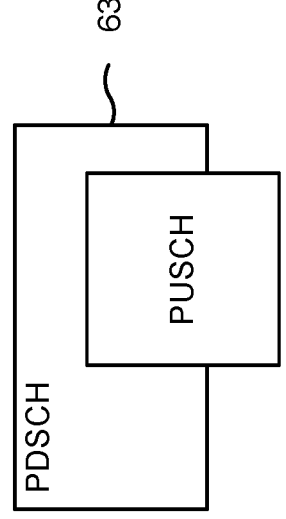
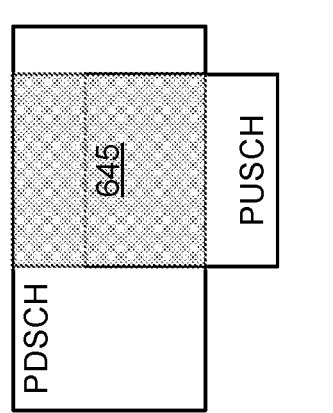
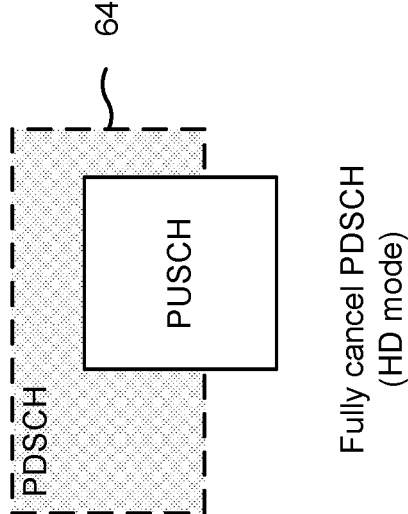
FIG. 6C

FIG. 6E

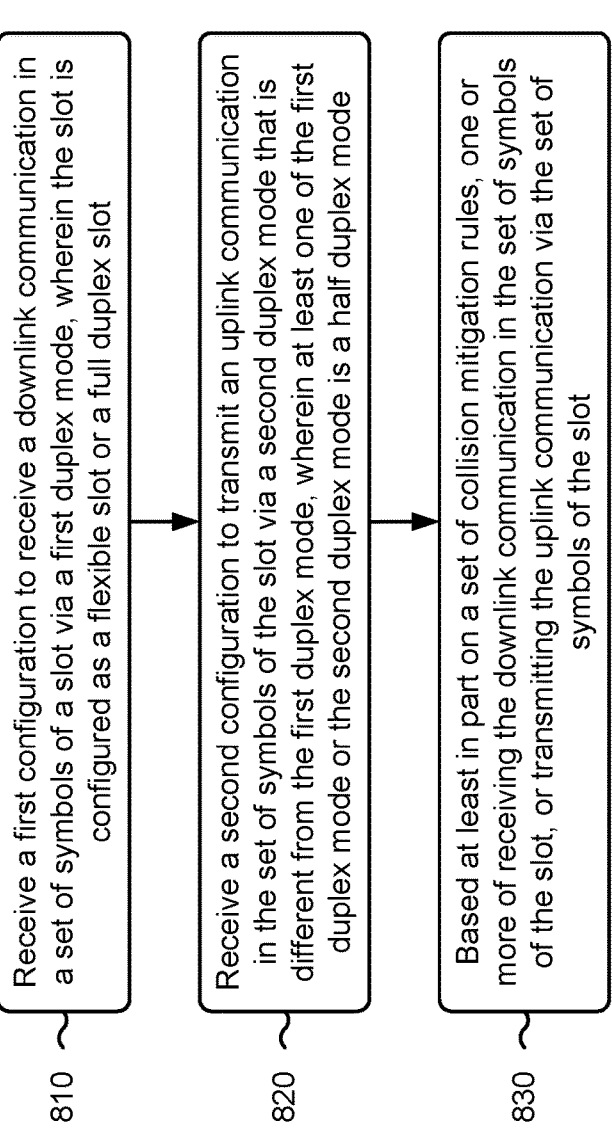

810 Receive a first configuration to receive a downlink communication in a set of symbols of a slot via a first duplex mode, wherein the slot is configured as a flexible slot or a full duplex slot 820 Receive a second configuration to transmit an uplink communication in the set of symbols of the slot via a second duplex mode that is different from the first duplex mode, wherein at least one of the first duplex mode or the second duplex mode is a half duplex mode 830 Based at least in part on a set of collision mitigation rules, one or more of receiving the downlink communication in the set of symbols of the slot, or transmitting the uplink communication via the set of symbols of the slot

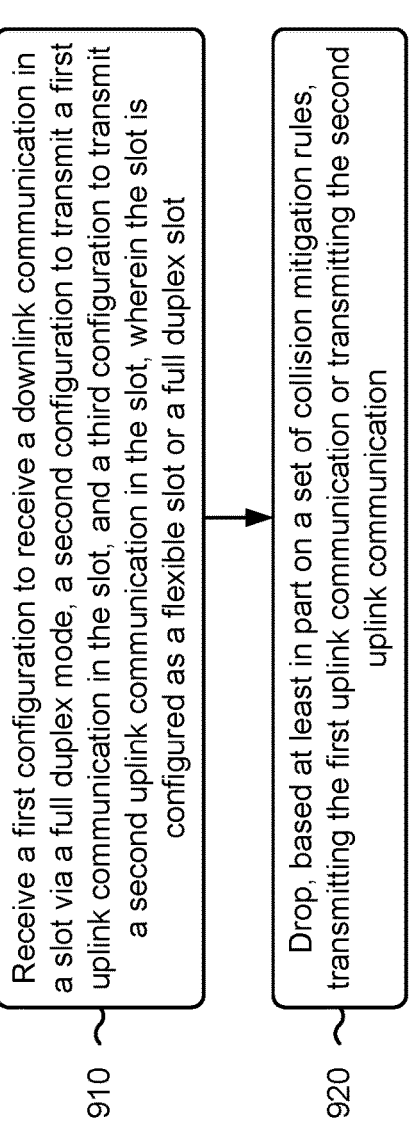

910 — Receive a first configuration to receive a downlink communication in a slot via a full duplex mode, a second configuration to transmit a first uplink communication in the slot, and a third configuration to transmit a second uplink communication in the slot, wherein the slot is configured as a flexible slot or a full duplex slot 920 — Drop, based at least in part on a set of collision mitigation rules, transmitting the first uplink communication or transmitting the second uplink communication

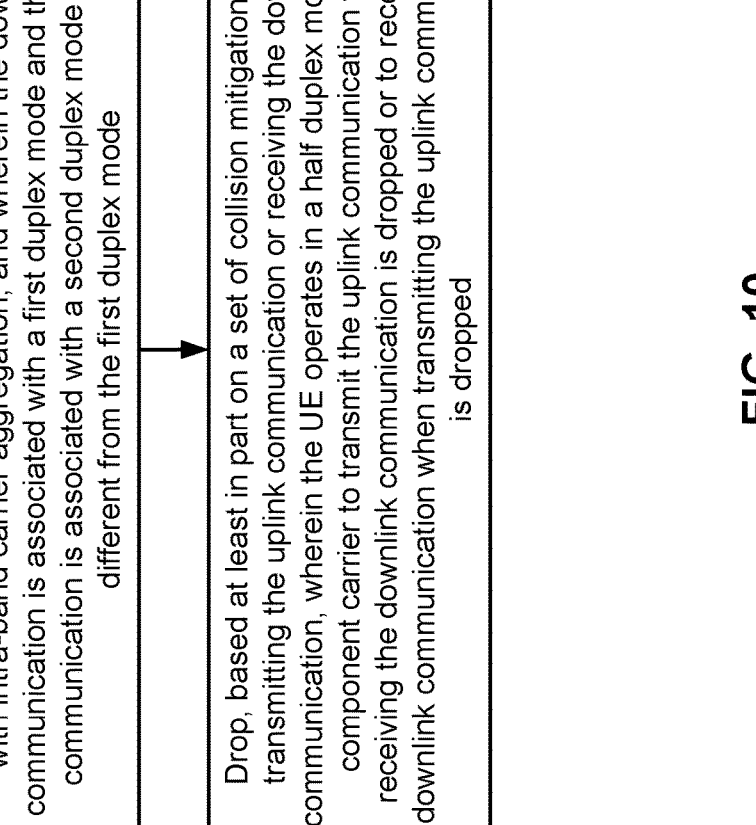

Receive a first configuration to receive a downlink communication in a slot of a component carrier via a full duplex mode and a second configuration to transmit an uplink communication in the slot of the component carrier, wherein the UE operates in a full duplex mode with intra-band carrier aggregation, and wherein the downlink communication is associated with a first duplex mode and the uplink communication is associated with a second duplex mode that is different from the first duplex mode

1010

Drop, based at least in part on a set of collision mitigation rules, transmitting the uplink communication or receiving the downlink communication, wherein the UE operates in a half duplex mode in the component carrier to transmit the uplink communication when receiving the downlink communication is dropped or to receive the downlink communication when transmitting the uplink communication is dropped

PRIORITY AND COLLISION HANDLING BETWEEN SEMI-STATIC AND/OR DYNAMIC GRANT UPLINK/DOWNLINK FOR FULL DUPLEX USER EQUIPMENT

FIELD OF THE DISCLOSURE

Aspects of the present disclosure generally relate to wireless communication and to techniques and apparatuses for priority and collision handling between semi-static and/or dynamic grant uplink/downlink for full duplex user equipment (UE).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a first configuration to receive a downlink communication in a set of symbols of a slot via a first duplex mode, wherein the slot is configured as a flexible slot or a full duplex slot. The method may include receiving a second configuration to transmit an uplink communication in the set of symbols of the slot via a second duplex mode that is different from the first duplex mode, wherein at least one of the first duplex mode or the second duplex mode is a half duplex mode. The method may include based at least in part on a set of collision mitigation rules, one or more of, receiving the downlink communication in the set of symbols of the slot, or transmitting the uplink communication via in set of symbols of the slot.

Some aspects described herein relate to a method of wireless communication performed by a UE. The method may include receiving a first configuration to receive a downlink communication in a slot via a full duplex mode, a second configuration to transmit a first uplink communication in the slot, and a third configuration to transmit a second uplink communication in the slot, wherein the slot is configured as a flexible slot or a full duplex slot. The method may include dropping, based at least in part on a set of collision mitigation rules, transmitting the first uplink communication or transmitting the second uplink communication.

Some aspects described herein relate to a method of wireless communication performed by a UE. The method may include receiving a first configuration to receive a downlink communication in a slot of a component carrier via a full duplex mode and a second configuration to transmit an uplink communication in the slot of the component carrier, wherein the UE operates in a full duplex mode with intra-band carrier aggregation, and wherein the downlink communication is associated with a first duplex mode and the uplink communication is associated with a second duplex mode that is different from the first duplex mode. The method may include dropping, based at least in part on a set of collision mitigation rules, transmitting the uplink communication or receiving the downlink communication, wherein the UE operates in a half duplex mode in the component carrier to transmit the uplink communication when receiving the downlink communication is dropped or to receive the downlink communication when transmitting the uplink communication is dropped.

Some aspects described herein relate to a UE for wireless communication. The UE may include a memory and one or more processors coupled to the memory. The one or more processors may be configured to receive a first configuration to receive a downlink communication in a set of symbols of a slot via a first duplex mode, wherein the slot is configured as a flexible slot or a full duplex slot. The one or more processors may be configured to receive a second configuration to transmit an uplink communication in the set of symbols of the slot via a second duplex mode that is different from the first duplex mode, wherein at least one of the first duplex mode or the second duplex mode is a half duplex mode. The one or more processors may be configured to based at least in part on a set of collision mitigation rules, one or more of.

Some aspects described herein relate to a UE for wireless communication. The UE may include a memory and one or more processors coupled to the memory. The one or more processors may be configured to receive a first configuration to receive a downlink communication in a slot via a full duplex mode, a second configuration to transmit a first uplink communication in the slot, and a third configuration to transmit a second uplink communication in the slot, wherein the slot is configured as a flexible slot or a full duplex slot. The one or more processors may be configured to drop, based at least in part on a set of collision mitigation rules, transmitting the first uplink communication or transmitting the second uplink communication.

Some aspects described herein relate to a UE for wireless communication. The UE may include a memory and one or more processors coupled to the memory. The one or more processors may be configured to receive a first configuration to receive a downlink communication in a slot of a component carrier via a full duplex mode and a second configuration to transmit an uplink communication in the slot of the component carrier, wherein the UE operates in a full duplex mode with intra-band carrier aggregation, and wherein the downlink communication is associated with a first duplex mode and the uplink communication is associated with a second duplex mode that is different from the first duplex mode. The one or more processors may be configured to drop, based at least in part on a set of collision mitigation rules, transmitting the uplink communication or receiving the downlink communication, wherein the UE operates in a half duplex mode in the component carrier to transmit the uplink communication when receiving the downlink communication is dropped or to receive the downlink communication when transmitting the uplink communication is dropped.

Some aspects described herein relate to a non-transitory computer-readable medium that stores a set of instructions for wireless communication by a UE. The set of instructions, when executed by one or more processors of the UE, may cause the UE to receive a first configuration to receive a downlink communication in a set of symbols of a slot via a first duplex mode, wherein the slot is configured as a flexible slot or a full duplex slot. The set of instructions, when executed by one or more processors of the UE, may cause the UE to receive a second configuration to transmit an uplink communication in the set of symbols of the slot via a second duplex mode that is different from the first duplex mode, wherein at least one of the first duplex mode or the second duplex mode is a half duplex mode. The set of instructions, when executed by one or more processors of the UE, may cause the UE to, based at least in part on a set of collision mitigation rules, one or more of receive the downlink communication in the set of symbols of the slot, or transmit the uplink communication via in set of symbols of the slot.

Some aspects described herein relate to a non-transitory computer-readable medium that stores a set of instructions for wireless communication by a one or more instructions that, when executed by one or more processors of a UE. The set of instructions, when executed by one or more processors of the UE, may cause the UE to receive a first configuration to receive a downlink communication in a slot via a full duplex mode, a second configuration to transmit a first uplink communication in the slot, and a third configuration to transmit a second uplink communication in the slot, wherein the slot is configured as a flexible slot or a full duplex slot. The set of instructions, when executed by one or more processors of the UE, may cause the UE to drop, based at least in part on a set of collision mitigation rules, transmitting the first uplink communication or transmitting the second uplink communication.

Some aspects described herein relate to a non-transitory computer-readable medium that stores a set of instructions for wireless communication by one or more processors of a UE. The set of instructions, when executed by one or more processors of the UE, may cause the UE to receive a first configuration to receive a downlink communication in a slot of a component carrier via a full duplex mode and a second configuration to transmit an uplink communication in the slot of the component carrier, wherein the UE operates in a full duplex mode with intra-band carrier aggregation, and wherein the downlink communication is associated with a first duplex mode and the uplink communication is associated with a second duplex mode that is different from the first duplex mode. The set of instructions, when executed by one or more processors of the UE, may cause the one or more instructions that, when executed by one or more processors of a UE to drop, based at least in part on a set of collision mitigation rules, transmitting the uplink communication or receiving the downlink communication, wherein the UE operates in a half duplex mode in the component carrier to transmit the uplink communication when receiving the downlink communication is dropped or to receive the downlink communication when transmitting the uplink communication is dropped.

Some aspects described herein relate to an apparatus for wireless communication. The apparatus may include means for receiving a first configuration to receive a downlink communication in a set of symbols of a slot via a first duplex mode, wherein the slot is configured as a flexible slot or a full duplex slot. The apparatus may include means for receiving a second configuration to transmit an uplink communication in the set of symbols of the slot via a second duplex mode that is different from the first duplex mode, wherein at least one of the first duplex mode or the second duplex mode is a half duplex mode. The apparatus may include based at least in part on a set of collision mitigation rules, one or more of, means for receiving the downlink communication in the set of symbols of the slot, or means for transmitting the uplink communication via in set of symbols of the slot.

Some aspects described herein relate to an apparatus for wireless communication. The apparatus may include means for receiving a first configuration to receive a downlink communication in a slot via a full duplex mode, a second configuration to transmit a first uplink communication in the slot, and a third configuration to transmit a second uplink communication in the slot, wherein the slot is configured as a flexible slot or a full duplex slot. The apparatus may include means for dropping, based at least in part on a set of collision mitigation rules, transmitting the first uplink communication or transmitting the second uplink communication.

Some aspects described herein relate to an apparatus for wireless communication. The apparatus may include means for receiving a first configuration to receive a downlink communication in a slot of a component carrier via a full duplex mode and a second configuration to transmit an uplink communication in the slot of the component carrier, wherein the UE operates in a full duplex mode with intra-band carrier aggregation, and wherein the downlink communication is associated with a first duplex mode and the uplink communication is associated with a second duplex mode that is different from the first duplex mode. The apparatus may include means for dropping, based at least in part on a set of collision mitigation rules, transmitting the uplink communication or receiving the downlink communication, wherein the UE operates in a half duplex mode in the component carrier to transmit the uplink communication when receiving the downlink communication is dropped or to receive the downlink communication when transmitting the uplink communication is dropped.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6A-6E and 7 are diagrams illustrating examples associated with for priority and collision handling between semi-static and/or dynamic grant uplink/downlink for FD UE, in accordance with the present disclosure.

FIGS. 8-10 are diagrams illustrating example processes associated with for priority and collision handling between semi-static and/or dynamic grant uplink/downlink for FD UE, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
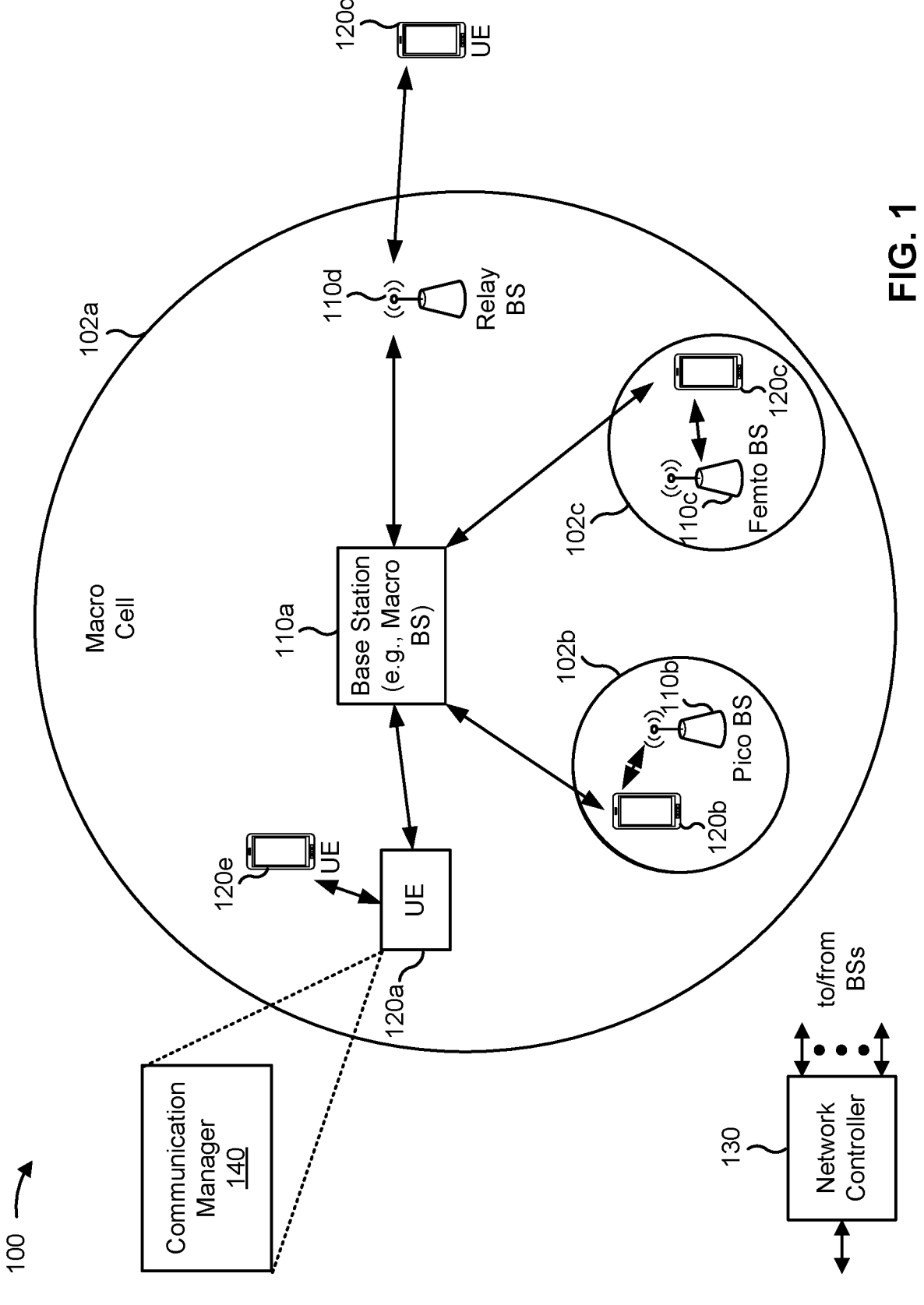
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may perform one or more operations associated with priority and collision handling between semi-static and/or dynamic grant uplink/downlink for full duplex UE. Additionally, or alternatively, the communication manager 140 may perform one or more other operations described herein.

As indicated above, FIG. 1 is provided as an example. Other examples may differ from what is described with regard to FIG. 1.

Figure 2:
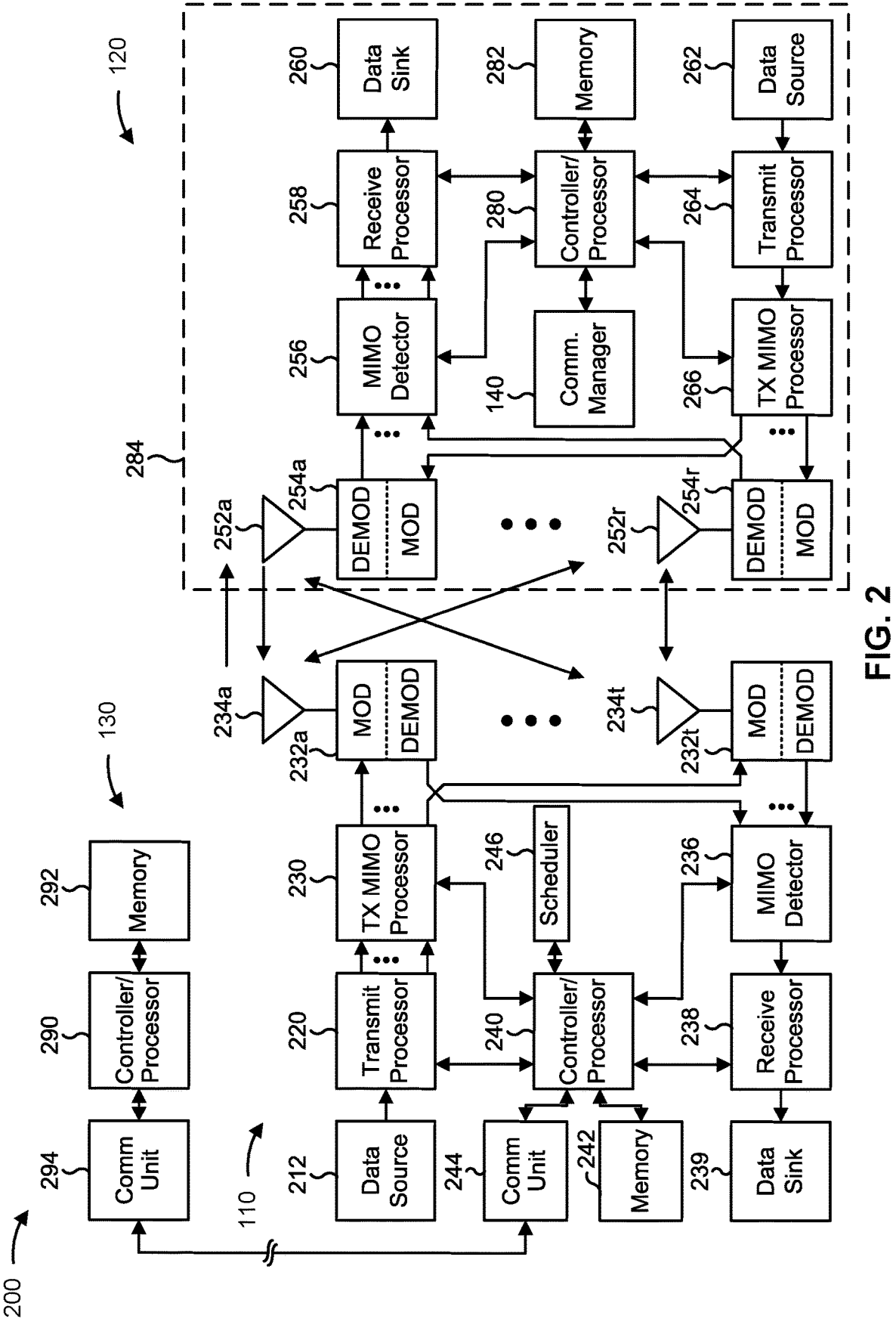
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6A-6E and 7-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6A-6E and 7-13).

The controller/processor 240 of the base station 110, the controller/processor 280 of the UE 120, and/or any other component(s) of FIG. 2 may perform one or more techniques associated with priority and collision handling between semi-static and/or dynamic grant uplink/downlink for a full duplex (FD) UE, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE includes means for receiving a first configuration to receive a downlink communication in a set of symbols of a slot via a first duplex mode, wherein the slot is configured as a flexible slot or an FD slot; means for receiving a second configuration to transmit an uplink communication in the set of symbols of the slot via a second duplex mode that is different from the first duplex mode, wherein at least one of the first duplex mode or the second duplex mode is a half duplex (HD) mode; and/or based at least in part on a set of collision mitigation rules, one or more of: means for receiving the downlink communication in the set of symbols of the slot, or means for transmitting the uplink communication via in set of symbols of the slot. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE includes means for receiving a first configuration to receive a downlink communication in a slot via an FD mode, a second configuration to transmit a first uplink communication in the slot, and a third configuration to transmit a second uplink communication in the slot, wherein the slot is configured as a flexible slot or an FD slot; and/or means for dropping, based at least in part on a set of collision mitigation rules, transmitting the first uplink communication or transmitting the second uplink communication. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE includes means for receiving a first configuration to receive a downlink communication in a slot of a component carrier via an FD mode and a second configuration to transmit an uplink communication in the slot of the component carrier, wherein the UE operates in an FD with intra-band carrier aggregation, and wherein the downlink communication is associated with a first duplex mode and the uplink communication is associated with a second duplex mode that is different from the first duplex mode; and/or means for dropping, based at least in part on a set of collision mitigation rules, transmitting the uplink communication or receiving the downlink communication, wherein the UE operates in a half duplex mode in the component carrier to transmit the uplink communication when receiving the downlink communication is dropped or to receive the downlink communication when transmitting the uplink communication is dropped. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3B:
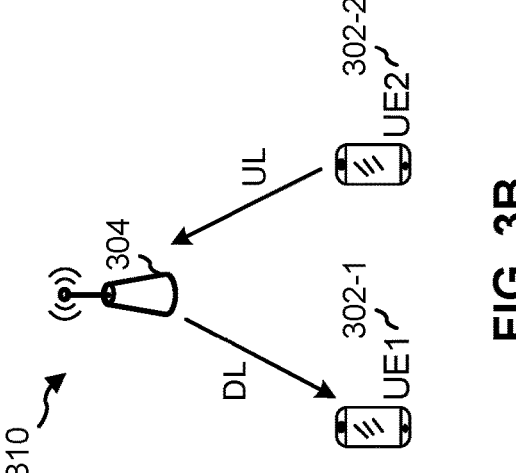
FIGS. 3A-3C are diagrams illustrating examples of full duplex (FD) communication in accordance with the present disclosure.
Figure 3C:
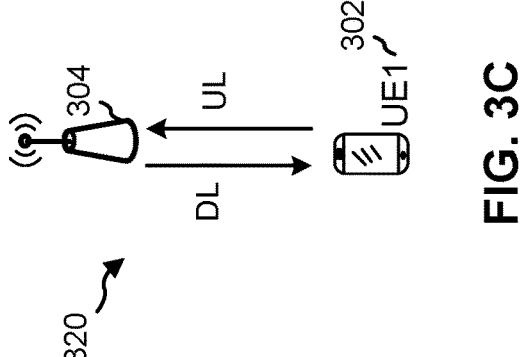
Figure 3A:
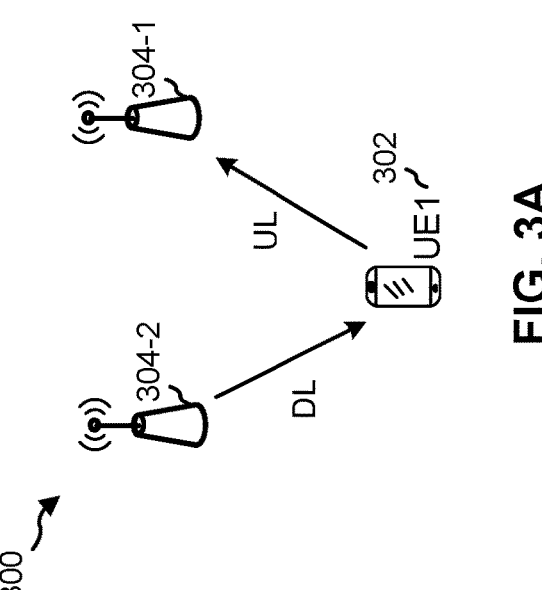

FIGS. 3A-3C are diagrams illustrating examples 300, 310, 320 of full duplex (FD) communication in accordance with the present disclosure. The example 300 of FIG. 3A includes a UE1 302 and two base stations (e.g., TRPs) 304-1, 304-2, where the UE1 302 is sending UL transmissions to base station 304-1 and is receiving DL transmissions from base station 304-2. In the example 300 of FIG. 3A, FD is enabled for the UE1 302, but not for the base stations 304-1, 304-2. The example 310 of FIG. 3B includes two UEs, shown as UE1 302-1 and UE2 302-2, and a base station 304, where the UE1 302-1 is receiving a DL transmission from the base station 304 and the UE2 302-2 is transmitting an UL transmission to the base station 304. In the example 310 of FIG. 3B, FD is enabled for the base station 304, but not for UE1 302-1 and UE2 302-2. The example 320 of FIG. 3C includes a UE1 302 and a base station 304, where the UE1 302 is receiving a DL transmission from the base station 304 and the UE1 302 is transmitting an UL transmission to the base station 304. In the example 320 of FIG. 3C, FD is enabled for both the UE1 302 and the base station 304.

As indicated above, FIGS. 3A-3C are provided as one or more examples. Other examples may differ from what is described with regard to FIGS. 3A-3C.

Figures 4A, 4B, 4C:
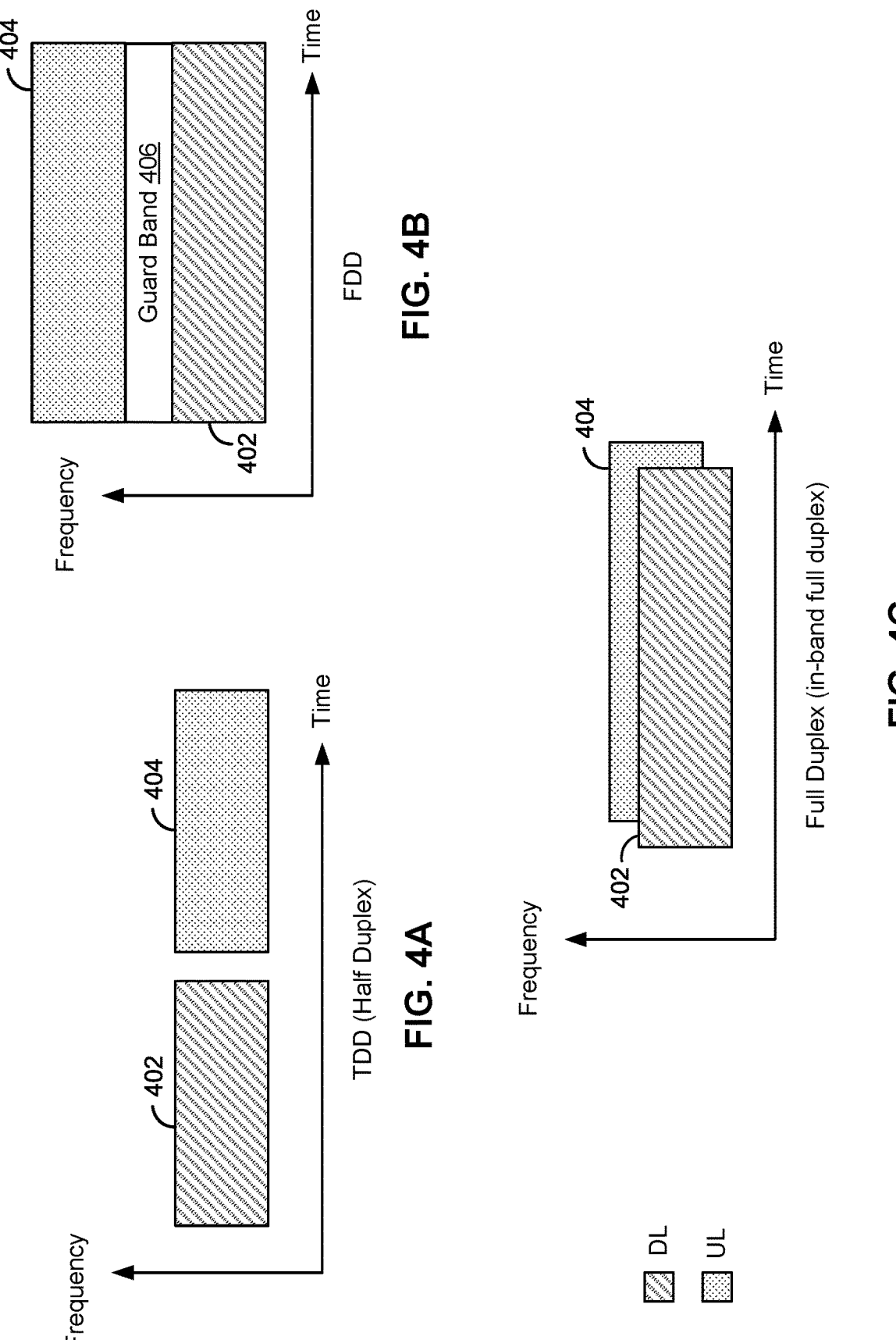
FIGS. 4A-4C are diagrams illustrating various duplexing modes in a radio access network, in accordance with the present disclosure.

FIGS. 4A-4C are diagrams illustrating various duplexing modes in a radio access network, in accordance with the present disclosure. FIG. 4A depicts a time division duplexing (TDD) mode of communication between a UE and a base station. In TDD, only one endpoint (e.g., one of a UE or a base station) may send information to another endpoint (e.g., the other of the UE or the base station) at a time. For example, in TDD, transmissions in different directions on a given channel are separated from one another using time division multiplexing. That is, at some times the channel is dedicated for transmissions in one direction, while at other times the channel is dedicated for transmissions in the other direction. In some cases, the direction may change rapidly, such as several times per slot. Thus, as illustrated in FIG. 4A, DL communications 402 are separated from UL communications 404 in time.

FIG. 4B depicts a frequency division duplexing (FDD) mode of communication between a UE and a base station. In FDD, both endpoints may simultaneously communicate with one another on different frequencies (e.g., different frequency bands, sets of sub-carriers, and/or resource blocks). In the FDD mode, as shown in FIG. 4B, transmissions in different directions operate at different carrier frequencies. Thus, as illustrated in FIG. 4B, DL communications 402 are separated from UL communications 404 in frequency, shown as a guard band 406. In some cases, FDD may be referred to as full duplex because a wireless communication device may be capable of transmitting and receiving at the same time, where transmission uses a first frequency and reception uses a second frequency. Because simultaneous transmission and reception by a device in FDD use different frequencies, this full duplex mode may be referred to as sub-band FDD.

FIG. 4C depicts a true FD mode of communication between a UE and a base station. In the true FD mode, as shown in FIG. 4C, transmissions in different directions operate at the same carrier frequency or within overlapping bandwidths. In the example shown in FIG. 4C, DL communications 402 overlap (e.g., partially or fully) UL communications 404 in both time and frequency. Thus, when operating in a true FD mode, the UE and base station are configured for concurrent transmission and reception within an overlapping bandwidth. That is, simultaneous transmission and reception by a device in this mode can use the same frequency. As a result, this FD mode may be referred to as in-band FD.

As indicated above, FIGS. 4A-4C are provided as examples. Other examples may differ from what is described with respect to FIGS. 4A-4C.

Figure 5:
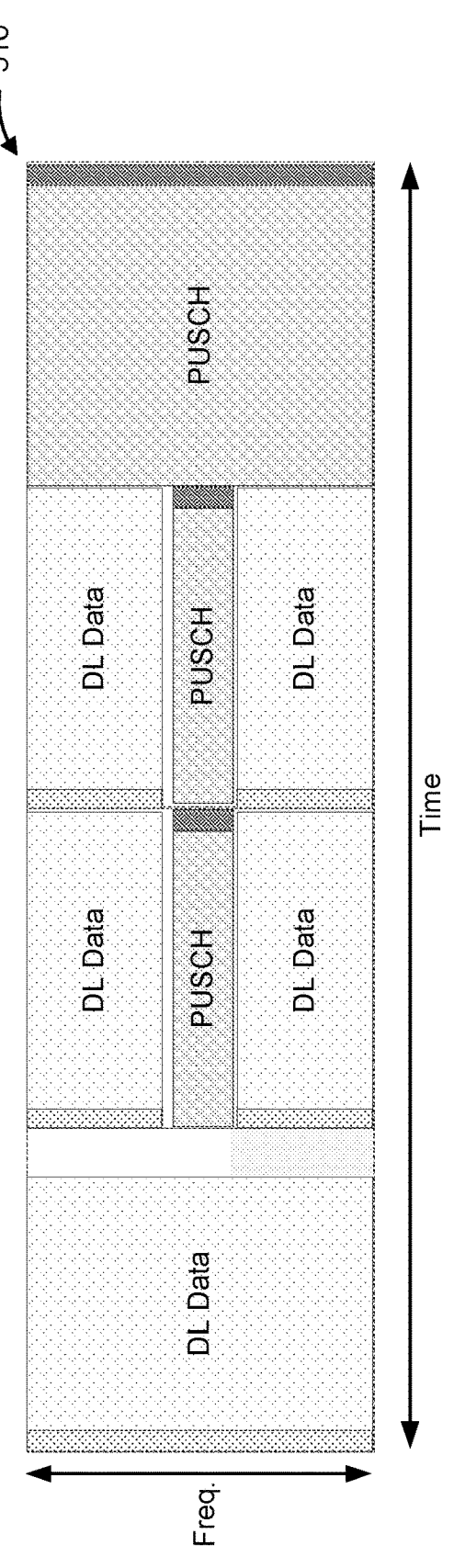
FIG. 5 is a diagram illustrating examples of a frequency division duplexing (FDD) configuration, in accordance with the present disclosure.

FIG. 5 is a diagram illustrating examples of an FDD configuration, in accordance with the present disclosure. FIG. 5 shows examples of time intervals 510 (e.g., slots, slot groups, subframes, sub-slots, and/or mini-slots). A time interval may include an uplink frequency region, a downlink frequency region, or both an uplink frequency region and a downlink frequency region. Each time interval may be associated with a control region, which is illustrated as a darker-shaded portion of the time interval, and/or a data region, which is shown as DL Data for a downlink frequency region or physical uplink shared channel (PUSCH) for an uplink frequency region. In FIG. 5, uplink frequency regions are illustrated using a tighter dotted fill than downlink frequency regions.

An FDD configuration may indicate a duplex mode for a time interval 510. For example, an FDD configuration may indicate that a time interval is fully uplink, fully downlink, flexible (e.g., uplink or downlink), or simultaneous (e.g., uplink and downlink (D+U). For example, an FDD configuration may divide an unpaired band (e.g., one or more component carriers of an unpaired band) into uplink frequency regions, downlink frequency regions, flexible frequency regions, D+U regions, or other regions (e.g., guard bands or control regions).

In some cases, the FDD configuration may be a semi-static configuration. For example, a UE may receive semi-persistent scheduling (SPS) or a configured grant (CG) indicating a duplex mode for one or more time intervals 510. In some cases, the FDD configuration may be a dynamic configuration. For example, a UE may receive downlink control information (DCI) dynamically configuring a duplex mode of one or more time intervals 510.

In some cases, in FD communication, a collision may occur between a downlink communication (e.g., a downlink signal or channel) and an uplink communication (e.g., an uplink signal or channel) scheduled at a same time interval configured as a flexible or simultaneous time interval. For example, a first configuration (e.g., a semi-static configuration or a dynamic configuration) may indicate that the downlink communication is associated with an HD mode and a second configuration (e.g., another semi-static configuration or another dynamic configuration) may indicate that the uplink communication is associated with an FD mode. As another example, the first configuration may indicate that the downlink communication is associated with an FD mode and the second configuration may indicate that the uplink communication is associated with an HD mode. As yet another example, the first configuration may indicate that the downlink communication is associated with an HD mode and the second configuration may indicate that the uplink communication is associated with an HD mode.

Some techniques and apparatuses described herein relate to a set of conflict mitigation rules for mitigating collisions between communications scheduled at flexible or simultaneous configured time intervals. In some aspects, a UE operating in an FD mode may, upon identifying an occurrence of a collision between an uplink communication and a downlink communication, utilize the set of collision mitigation rules to determine whether to transmit the uplink communication and cancel receiving the downlink communication, cancel transmitting the uplink communication and receive the downlink communication, or transmit the uplink communication and receive the downlink communication (e.g., with one or more modifications to the transmission of the uplink communication, as described elsewhere herein).

As indicated above, FIG. 5 is provided as an example. Other examples may differ from what is provided with regard to FIG. 5.

Figure 6A:
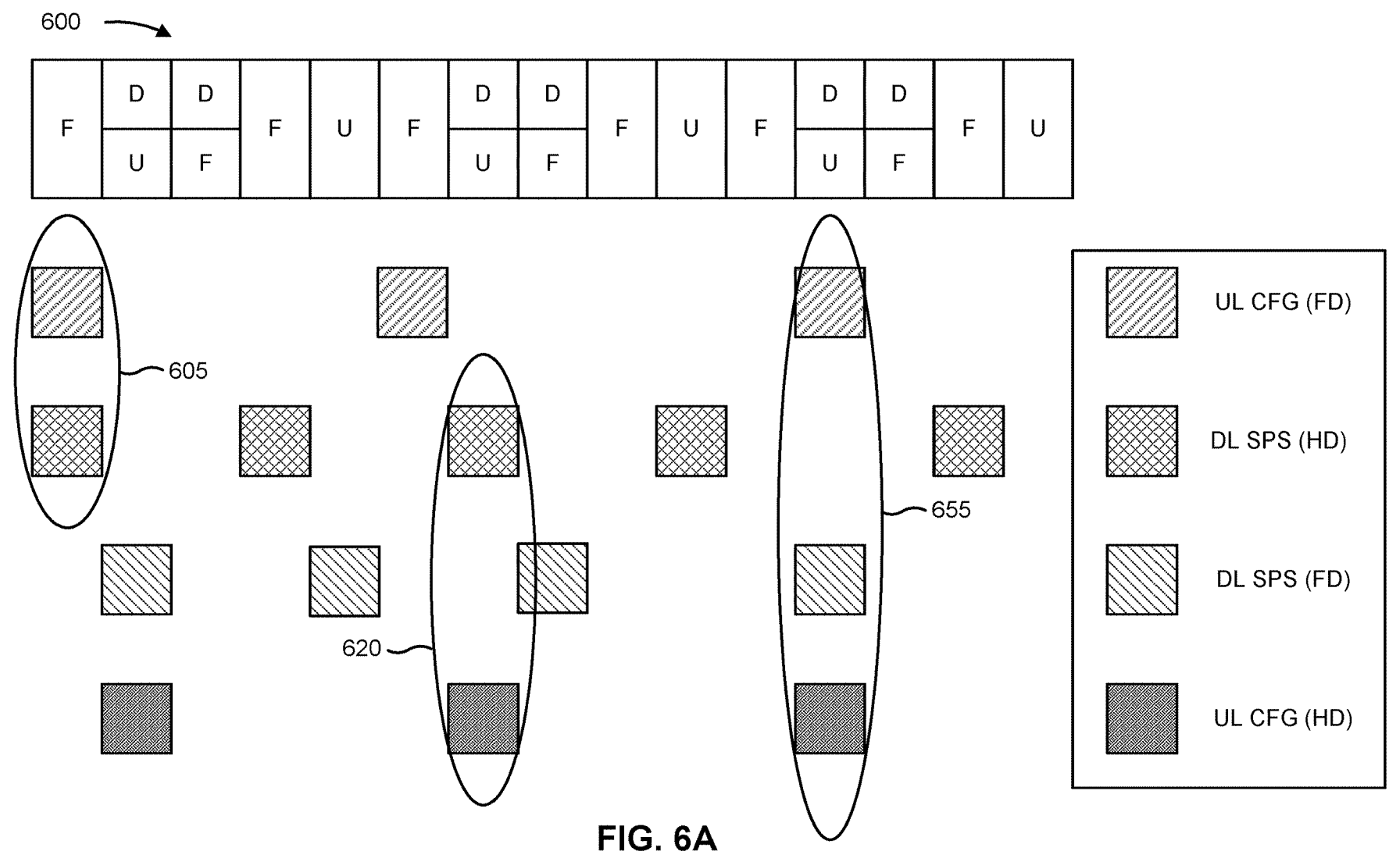
Figure 6B:
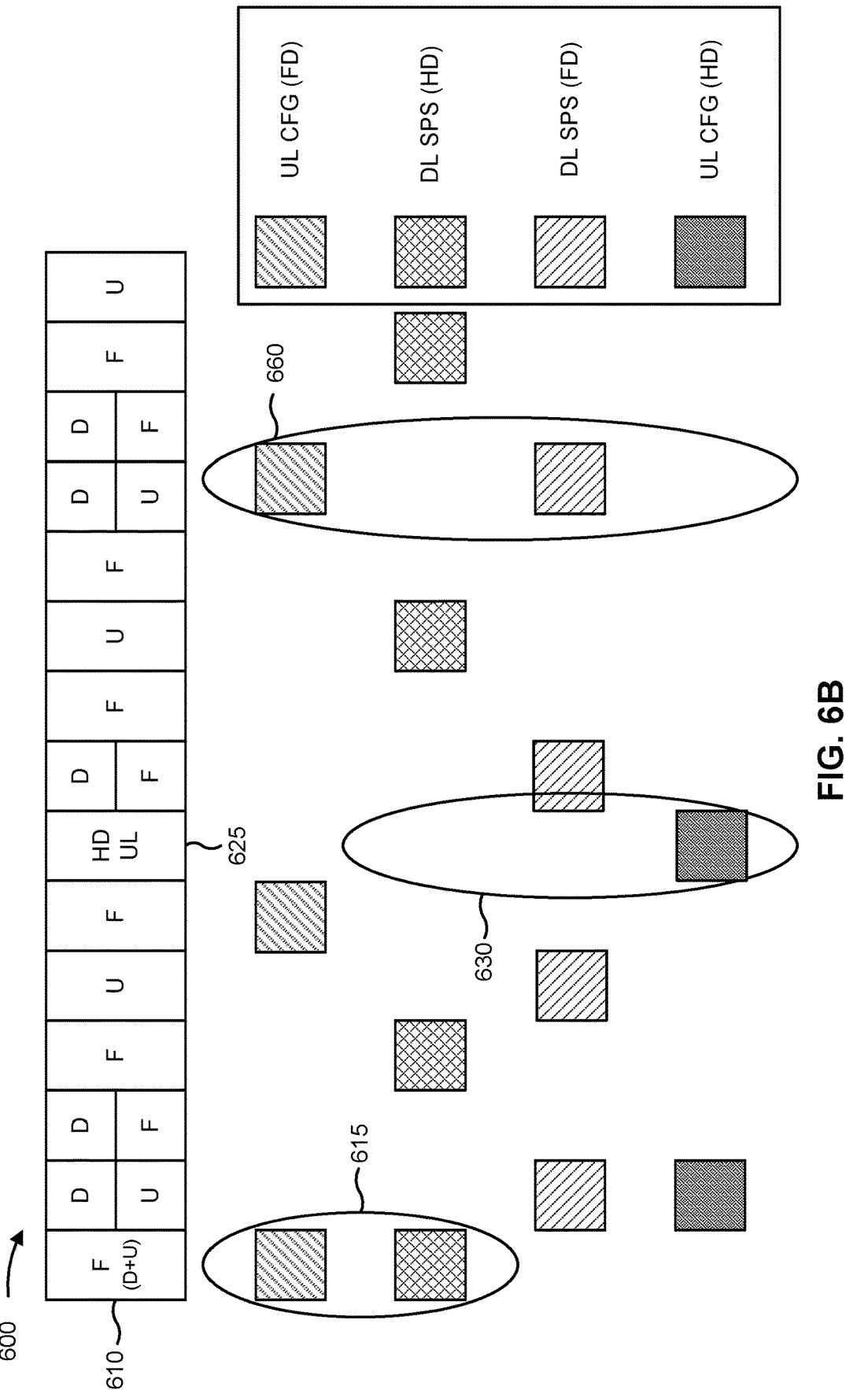

FIGS. 6A-6C are diagrams illustrating an example 600 associated with priority and collision handling between semi-static and/or dynamic grant uplink/downlink for FD UE, in accordance with the present disclosure.

In some aspects, as shown by reference number 605, a collision may occur within a flexible slot or at full duplex time slot between a downlink communication associated with an HD mode and an uplink communication associated with an FD mode. In some aspects, the downlink communication and the uplink communication may be associated with semi-static configurations. For example, a UE (e.g., UE 120) may receive a configured grant (CFG) (e.g., from a base station (e.g., base station 110)). The configured grant may indicate that the uplink communication is associated with an FD mode. In some aspects, the configured grant may schedule the uplink communication at the flexible slot. In some aspects, the configured grant may schedule the uplink communication at a slot prior to the flexible slot and a periodicity associated with the configured grant may cause an instance of the uplink communication to occur within the flexible slot.

Additionally, the UE may receive SPS. The SPS may schedule the downlink communication at the flexible slot, a downlink slot or a full duplex slot and may indicate that the downlink communication is associated with an HD mode. In some aspects, the UE may identify the occurrence of the collision based at least in part on receiving the configured grant or the SPS.

In some aspects, the UE may determine a set of collision mitigation rules associated with the collision. For example, the UE may identify a set of collision mitigation rules, of a plurality of sets of mitigation rules, associated with collisions between semi-static configured uplink and downlink communications. The UE may perform one or more actions to mitigate an effect of the collision based at least in part on the set of collision mitigation rules.

In some aspects, the set of collision mitigation rules may indicate that the UE is to operate in the HD mode during the flexible slot and that the UE is to cancel one of receiving the downlink communication or transmitting the uplink communication. The UE may operate in the HD mode and may cancel one of receiving the downlink communication or transmitting the uplink communication, as described in greater detail elsewhere herein.

In some aspects, the configuration associated with the uplink communication and the configuration associated with the downlink communication may be dynamically granted configurations. The set of collision mitigation rules may indicate that the duplex mode associated with the flexible slot or full duplex slot is determined based at least in part on a time at which the configuration associated with the uplink communication is received relative to a time at which the configuration associated with the downlink communication is received.

For example, the set of collision mitigation rules may indicate that the flexible slot is to be configured based at least in part on a duplex mode associated with the downlink communication when the downlink communication is received prior to the configuration associated with the uplink communication. As another example, the set of collision mitigation rules may indicate that the flexible slot is to be configured based at least in part on a duplex mode associated with the downlink communication when the downlink communication is received after the configuration associated with the uplink communication.

As another example, the set of collision mitigation rules may indicate that the flexible slot is to be configured based at least in part on a duplex mode associated with the uplink communication when the uplink communication is received prior to the configuration associated with the downlink communication. As another example, the set of collision mitigation rules may indicate that the flexible slot is to be configured based at least in part on a duplex mode associated with the uplink communication when the uplink communication is received after the configuration associated with the downlink communication.

In some aspects, the UE may configure the flexible slot according to the duplex mode associated with the uplink communication based at least in part applying the set of collision mitigation rules to the time at which the configuration associated with the uplink communication was received relative to the time at which the configuration associated with the downlink communication was received.

In some aspects, the configuration associated with the downlink (or uplink) configuration is dynamically granted and the configuration associated with the uplink (or downlink) configuration is a semi-static configuration. In some aspects, the set of collision mitigation rules may indicate that, when a priority associated with the downlink communication is the same as a priority associated with the uplink communication, the UE is to cancel receiving the downlink communication based at least in part on the configuration associated with the downlink configuration being a dynamically granted configuration and the configuration associated with the uplink configuration being a semi-static configuration.

As shown in FIG. 6B, and by reference number 610, the flexible slot is utilized as an FD slot based at least in part on the set of collision mitigation rules. As shown by reference number 615, the UE may receive the downlink communication and may transmit the uplink communication based at least in part on the flexible slot being utilized as an FD slot. In some aspects, the UE may transmit the uplink communication with one or more modifications. For example, the set of collision mitigation rules may indicate that the UE is to perform one or more actions associated with transmitting the uplink communication or downlink reception. In some aspects, the one or more actions may include performing a power control function associated with transmitting the uplink communication, selecting a new beam for the uplink communication, selecting a new beam pair for the uplink communication and the downlink communication, performing resource allocation rate matching, or performing resource allocation puncturing, among other examples.

In some aspects, the collision may be associated with a set of symbols of the slot. For example, the uplink communication and the downlink communication may only overlap at a particular set of symbols of the slot. The UE may perform the one or more actions only for the particular set of symbols of the slot based at least in part on the collision being associated with only the particular set of symbols.

In some aspects, as shown in FIG. 6A, and by reference number 620, a collision may occur within a simultaneous full duplex slot between a downlink communication associated with an HD mode and an uplink communication associated with an HD mode. In some aspects, the set of collision mitigation rules may indicate that the UE is to receive the downlink communication and transmit the uplink communication, in a manner similar to that described elsewhere herein. In some aspects, the set of mitigation rules indicates that the UE is to transmit the uplink communication with one or more modification, in a manner similar to that described elsewhere herein. In some aspects, the set of collision mitigation rules may indicate that the UE is to operate in the HD mode during the simultaneous slot and that the UE is to cancel one of receiving the downlink communication or transmitting the uplink communication.

As shown in FIG. 6B, and by reference number 625, the UE may operate in the HD mode during the simultaneous slot. In some implementations, the UE may determine to cancel one of receiving the downlink communication or transmitting the uplink communication based at least in part on the set of collision mitigation rules.

In some aspects, the set of collision mitigation rules may include a plurality of rules and may indicate an order in which the plurality of rules are to be applied. For example, the set of collision mitigation rules may include a set of priority rules and an order in which the priority rules are to be applied.

In some aspects, the set of priority rules may include a first priority rule indicating a priority of the downlink communication relative to a priority of the uplink communication. In some aspects, the set of collision mitigation rules indicates that the first priority rule is to be applied prior to the other priority rules. The UE may cancel receiving the downlink communication or transmitting the uplink communication based at least in part on the first priority rule.

In some aspects, the set of priority rules may include a second priority rule. In some aspects, the set of collision mitigation rules may indicate that the second priority rule is to be applied after the first priority rule. The second priority rule may indicate that the UE is to cancel transmitting the uplink communication or receiving the downlink communication based at least in part on a priority associated with the duplex mode of the uplink communication relative to a priority associated with the duplex mode of the downlink communication, as described in greater detail elsewhere herein.

In some aspects, the uplink communication and the downlink communication may be associated with the same duplex mode. For example, as shown in FIG. 6A, the uplink communication and the downlink communication may be associated with an HD mode. In some aspects, the set of priority rules may include a third priority rule. In some aspects, the set of collision mitigation rules may indicate that the third priority rule is to be applied after the second plurality rule. The third priority rule may indicate that, when a priority of the duplex modes are the same, the UE is to cancel receiving the downlink communication or transmitting the uplink communication based at least in part on a priority associated with a signal or a channel associated with the downlink communication relative to a priority associated with a signal or a channel associated with the uplink communication.

In some aspects, the third priority rule may indicate that transmitting the uplink communication is cancelled when a priority of a signal or a channel associated with the uplink communication is a lower priority relative to a priority of a signal or a channel associated with the downlink communication. In some aspects, the third priority rule may indicate that receiving the downlink communication is cancelled when the priority of the signal or the channel associated with the downlink communication is the lower priority relative to the priority of the signal or the channel associated with the uplink communication. As an example, the third priority rule may indicate that the priority of the uplink communication is the lower priority when the uplink communication is associated with enhanced mobile broadband (eMBB) communications and the downlink communication is associated with ultra-reliable low-latency communications (URLLC).

In some aspects, a priority of a signal or a channel associated with the uplink communication and a priority of a signal or a channel associated with the downlink communication may be the same priority. The set of priority rules may include a fourth priority rule. In some aspects, the set of collision mitigation rules may indicate that the fourth priority rule is to be applied after the third priority rule. The fourth priority rule may indicate that, when a priority of a signal or a channel associated with the uplink communication and a priority of a signal or a channel associated with the downlink communication are the same, the UE is to cancel receiving the downlink communication or transmitting the uplink communication based at least in part on a priority associated with a content of the downlink communication relative to a priority associated with a content of the uplink communication.

For example, the fourth priority rule may indicate that a channel state information (CSI) report included in the uplink communication is a higher priority than a physical downlink shared channel (PDSCH) included in the downlink communication. The UE may cancel receiving the downlink communication based at least in part on the CSI report being a higher priority relative to the priority of the PDSCH.

In some aspects, a priority of the content of the uplink communication and a priority of the content of the downlink communication may be the same priority. The set of priority rules may include a fifth priority rule. In some aspects, the set of collision mitigation rules may indicate that the fifth priority rule is to be applied after the fourth priority rule. The fifth priority rule may indicate that, when a priority of the content of the uplink communication and a priority of the content of the downlink communication are the same, the UE is to cancel receiving the downlink communication or transmitting the uplink communication based at least in part on a priority associated with a time domain behavior of the downlink communication relative to a priority of a time domain behavior of the uplink communication. For example, the fifth priority rule may indicate that an aperiodic signal is a higher priority than a P/SP and the SP is higher priority than P.

In some aspects, a priority of the time domain behavior of the uplink communication and a priority of the time domain behavior of the downlink communication may be the same priority. The set of priority rules may include a sixth priority rule. In some aspects, the set of collision mitigation rules may indicate that the sixth priority rule is to be applied after the fifth priority rule. The sixth priority rule may indicate that, when a priority of the time domain behavior of the uplink communication and a priority of the time domain behavior of the downlink communication are the same, the UE is to cancel receiving the downlink communication or transmitting the uplink communication based at least in part on a quantity of overlapping symbols of the downlink communication relative to a quantity of overlapping symbols of the uplink communication. For example, the sixth priority rule may indicate that the UE is to cancel the receiving the downlink communication when the quantity of overlapping symbols of the downlink communication is greater than the quantity of overlapping symbols of the uplink communication.

In some aspects, the set of priority rules may include a seventh priority rule. In some aspects, the set of collision mitigation rules may indicate that the seventh priority rule is to be applied after the sixth priority rule. The seventh priority rule may indicate that the UE is to cancel receiving the downlink communication or transmitting the uplink communication based at least in part on a time at which a configuration associated with the uplink communication was received relative to a time at which a configuration associated with the downlink was received. In some aspects, the seventh priority rule may indicate that transmitting the uplink communication is cancelled when the configuration associated with the downlink communication is received prior to the configuration associated with the uplink communication being received. In some aspects, the seventh priority rule may indicate that transmitting the uplink communication is cancelled when the configuration associated with the downlink communication is received after the configuration associated with the uplink communication is received.

In some aspects, the UE may cancel one receiving the downlink communication or transmitting the uplink communication based at least in part on applying the set of collision mitigation rules. For example, as shown by reference number 630, the UE may cancel receiving the downlink communication and may transmit the uplink communication.

In some aspects, as shown in FIG. 6C, and by reference number 635, the downlink communication (e.g., a PDSCH, as shown) and the uplink communication (e.g., a PUSCH, as shown) may overlap in frequency. In some aspects, as shown by reference number 640, the set of collision mitigation rules may indicate that the UE is to fully cancel the downlink communication. For example, the set of collision mitigation rules may indicate that the downlink communication is to be cancelled at all frequency resources.

In some aspects, as shown by reference number 645, the set of collision mitigation rules may indicate that the downlink communication is to be cancelled at frequency resources associated with overlapping symbols with the uplink communication. In some aspects, as shown by reference number 650, the set of collision mitigation rules may indicate that the downlink communication is to be cancelled at only the frequency resources that overlap with the uplink communication. In some aspects, the set of collision mitigation rules may indicate that the downlink communication is to be cancelled at all frequency resources or that the downlink communication is to be cancelled at only the frequency resources that overlap with the uplink communication based at least in part on a capability of the UE to maintain phase coherency.

In some aspects, as shown in FIG. 6A, and by reference number 655, the UE may receive a first configuration to receive a downlink communication in a simultaneous slot via a full duplex mode, a second configuration to transmit a first uplink communication in the simultaneous slot, and a third configuration to transmit a second uplink communication in the simultaneous slot. The UE may utilize the set of collision mitigation rules to determine whether to cancel the transmission of the first uplink communication or the second uplink communication.

In some aspects, the set of collision mitigation rules may indicate that the UE is to cancel the transmission of the first uplink communication or the second uplink communication based at least in part on a level of interference between the first uplink communication and the downlink communication and a level of interference between the second uplink communication and the downlink communication. For example, the set of collision mitigation rules may indicate that the UE is to cancel the transmission of the first uplink communication when a level of interference between the first uplink communication and the downlink communication is greater than a level of interference between the second uplink communication and the downlink communication. Alternatively, or additionally, the set of collision mitigation rules may indicate that the UE is to cancel the transmission of the first uplink communication when the interference level between the first uplink communication and the downlink communication satisfies a threshold.

In some aspects, at least one of the level of interference between the first uplink communication and the downlink communication or the level of interference between the second uplink communication and the downlink communication is determined based at least in part on a quantity of overlapping resource elements between the first uplink communication and the downlink communication relative to a quantity of overlapping resource elements between the second uplink communication and the downlink communication, a size of a guard band between the first uplink communication and the downlink communication relative to a size of a guard band between the second uplink communication and the downlink communication, an uplink power associated with the first uplink communication, an uplink power associated with the second uplink communication, whether a beam associated with the first uplink communication is different from a beam associated with the downlink communication, whether a beam associated with the second uplink communication is different from a beam associated with the downlink communication, or a beam width of a beam associated with the first uplink communication relative to a beam width of a beam associated with the second uplink communication.

In some aspects, the set of collision mitigation rules may indicate that the UE is to determine to cancel the first uplink communication or the second uplink communication based at least in part on a duplex mode associated with the first uplink communication and a duplex mode associated with the second uplink communication. For example, the set of collision mitigation rules indicates that an uplink communication associated with an FD mode is prioritized over an uplink communication associated with an HD mode.

In some aspects, the set of collision mitigation rules may indicate that the UE is to determine to cancel the transmission of the first uplink communication or the second uplink communication based at least in part on a priority associated with the downlink communication. For example, the set of collision mitigation rules may indicate that the UE is to cancel the transmission of the first uplink communication when a priority associated with the first uplink communication is a lower priority relative to the priority of the downlink communication or a priority of the second uplink communication is a higher priority relative to the priority of the downlink communication or the first uplink communication.

In some aspects, the set of collision mitigation rules may indicate that the UE is to determine to cancel the transmission of the first uplink communication or the second uplink communication based at least in part on whether the second configuration is received prior to the third configuration. For example, the set of collision mitigation rules may indicate that the UE is to cancel the transmission of the first uplink communication when the second configuration is received prior to (or after) the third configuration.

In some aspects, the set of collision mitigation rules may indicate that the UE is to determine to cancel the transmission of the first uplink communication or the second uplink communication based at least in part on whether the second configuration is a semi-static configuration or a dynamically generated configuration and whether the third configuration is the semi-static configuration or the dynamically generated configuration.

In some aspects, the set of collision mitigation rules may indicate that the UE is to cancel the transmission of the first uplink communication when the first uplink communication is not a retransmission of a prior first uplink communication and the second uplink transmission is a retransmission of a prior second uplink communication. As shown in FIG. 6B, and by reference number 660, the UE may cancel the transmission of the second uplink communication (e.g., UL CFG (HD), as shown) based at least in part on applying the set of collision mitigation rules.

Figure 6D:
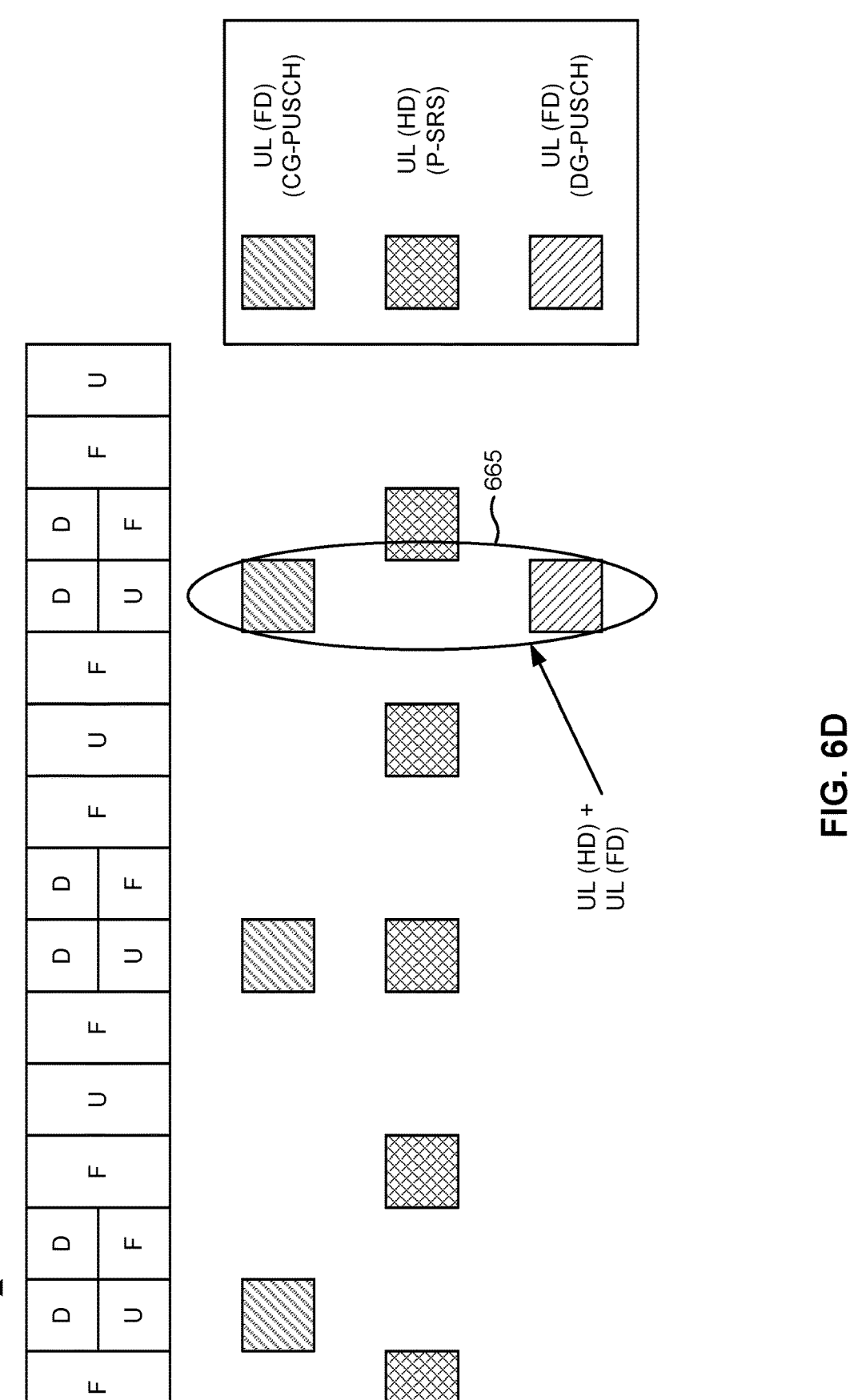

In some aspects, as shown in FIG. 6D, and by reference number 665, the UE may receive a first configuration to transmit a first uplink communication in a simultaneous slot via a full duplex mode and a second configuration to transmit a second uplink communication in the simultaneous slot via a full duplex mode. The first configuration and/or the second configuration may be a semi-static configuration and/or a dynamic configuration. For example, as shown in FIG. 6D, the first uplink transmission may correspond to a configured grant associated with transmitting a first PUSCH and the second uplink transmission may correspond to a dynamic grant associated with transmitting a second PUSCH. The UE may utilize the set of collision mitigation rules to determine whether to cancel the transmission of the first uplink communication, cancel the transmission of the second uplink communication, or to reconfigure the slot and transmit the first uplink communication and the second uplink communication via an HD mode with or without one or more modifications.

In some aspects, the set of collision mitigation rules may indicate that the UE is to cancel the transmission of the first uplink communication or the second uplink communication based at least in part on a level of interference between the first uplink communication and the downlink communication and a level of interference between the second uplink communication and the downlink communication. For example, the set of collision mitigation rules may indicate that the UE is to cancel the transmission of the first uplink communication when a level of interference between the first uplink communication and the downlink communication is greater than a level of interference between the second uplink communication and the downlink communication. Alternatively, or additionally, the set of collision mitigation rules may indicate that the UE is to cancel the transmission of the first uplink communication when the interference level between the first uplink communication and the downlink communication satisfies a threshold.

In some aspects, at least one of the level of interference between the first uplink communication and the downlink communication or the level of interference between the second uplink communication and the downlink communication is determined based at least in part on a quantity of overlapping resource elements between the first uplink communication and the downlink communication relative to a quantity of overlapping resource elements between the second uplink communication and the downlink communication, a size of a guard band between the first uplink communication and the downlink communication relative to a size of a guard band between the second uplink communication and the downlink communication, an uplink power associated with the first uplink communication, an uplink power associated with the second uplink communication, whether a beam associated with the first uplink communication is different from a beam associated with the downlink communication, whether a beam associated with the second uplink communication is different from a beam associated with the downlink communication, or a beam width of a beam associated with the first uplink communication relative to a beam width of a beam associated with the second uplink communication.

In some aspects, the set of collision mitigation rules may indicate that the UE is to determine to cancel the first uplink communication or the second uplink communication based at least in part on a duplex mode associated with the first uplink communication and a duplex mode associated with the second uplink communication. For example, the set of collision mitigation rules indicates that an uplink communication associated with an FD mode is prioritized over an uplink communication associated with an HD mode.

In some aspects, the set of collision mitigation rules may indicate that the UE is to determine to cancel the transmission of the first uplink communication or the second uplink communication based at least in part on a priority associated with the downlink communication. For example, the set of collision mitigation rules may indicate that the UE is to cancel the transmission of the first uplink communication when a priority associated with the first uplink communication is a lower priority relative to the priority of the downlink communication or a priority of the second uplink communication is a higher priority relative to the priority of the downlink communication or the first uplink communication.

In some aspects, the set of collision mitigation rules may indicate that the UE is to determine to cancel the transmission of the first uplink communication or the second uplink communication based at least in part on whether the second configuration is received prior to the third configuration. For example, the set of collision mitigation rules may indicate that the UE is to cancel the transmission of the first uplink communication when the second configuration is received prior to (or after) the third configuration.

In some aspects, the set of collision mitigation rules may indicate that the UE is to determine to cancel the transmission of the first uplink communication or the second uplink communication based at least in part on whether the second configuration is a semi-static configuration or a dynamically generated configuration and whether the third configuration is the semi-static configuration or the dynamically generated configuration.

Figure 6E:
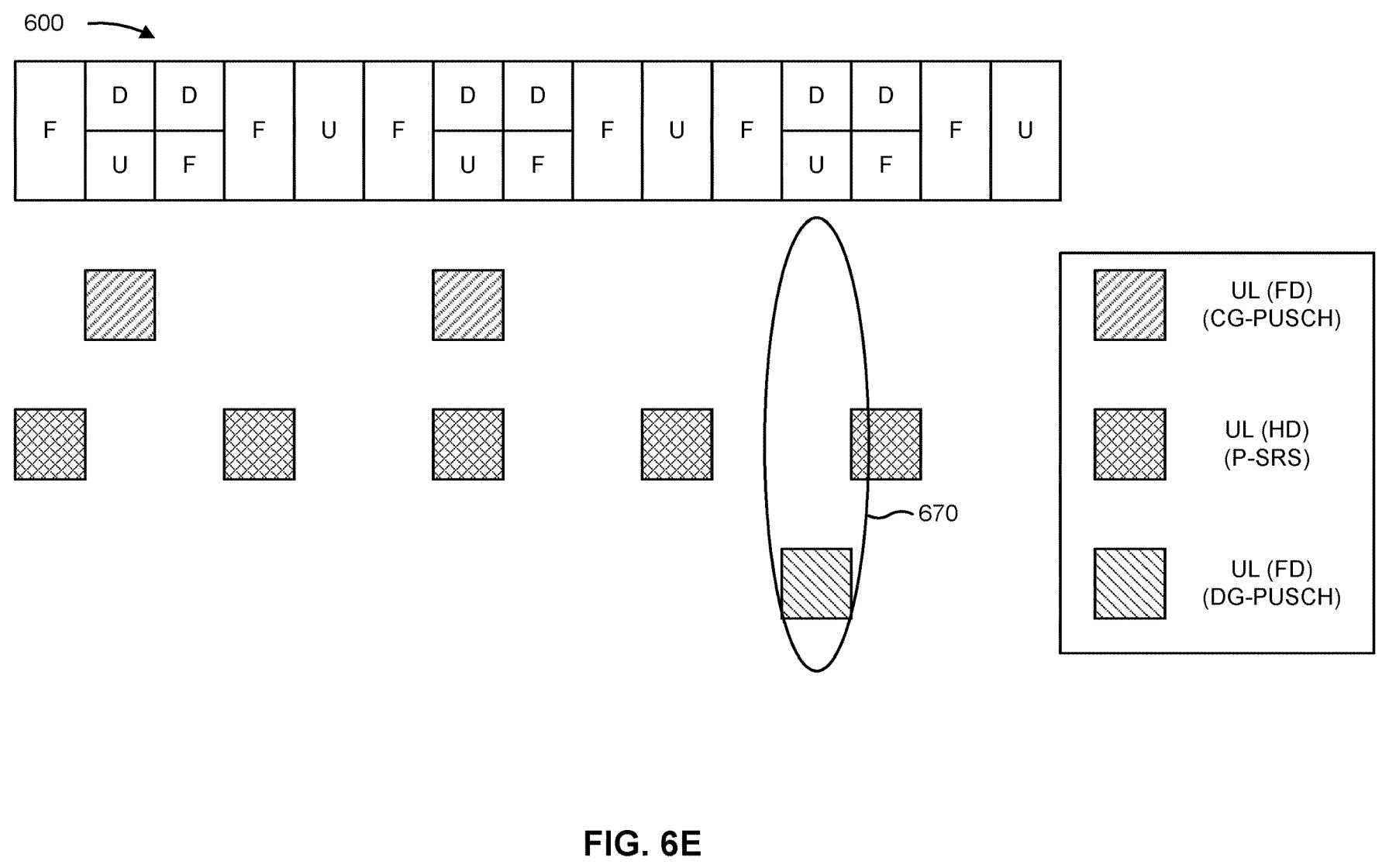

In some aspects, the set of collision mitigation rules may indicate that the UE is to cancel the transmission of the first uplink communication when the first uplink communication is not a retransmission of a prior first uplink communication and the second uplink transmission is a retransmission of a prior second uplink communication. As shown in FIG. 6E, and by reference number 670, the UE may cancel transmitting the first uplink communication (e.g., UL (FD) (CG-PUSCH), as shown) based at least in part on applying the set of collision mitigation rules.

As indicated above, FIGS. 6A-6E are provided as an example. Other examples may differ from what is described with respect to FIGS. 6A-6E.

Figure 7:
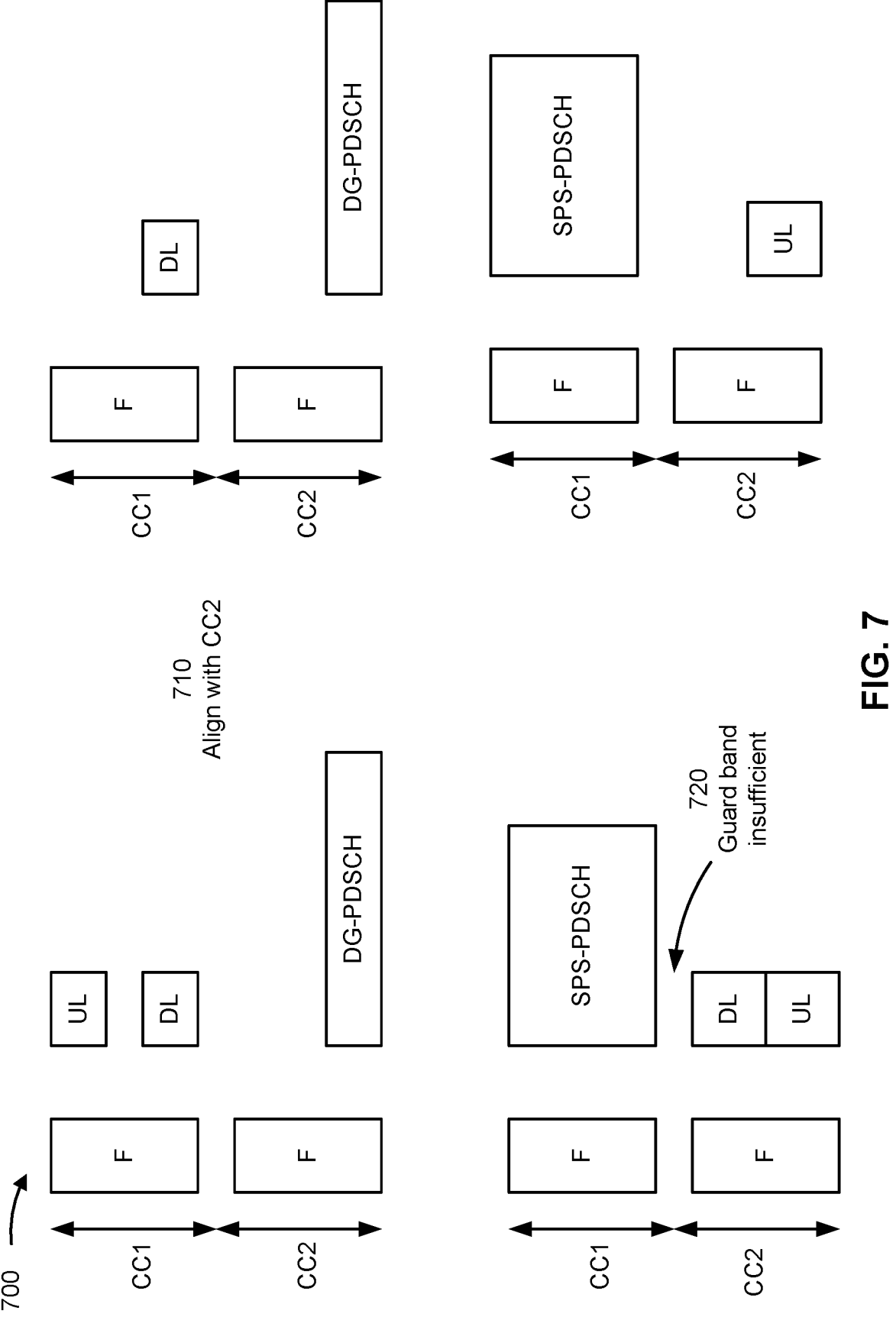

FIG. 7 is a diagram illustrating an example 700 associated with priority and collision handling between semi-static and/or dynamic grant uplink/downlink for FD UE, in accordance with the present disclosure.

In some aspects, a UE (e.g., UE 120) may receive a first configuration to receive a downlink communication in a slot of a component carrier and a second configuration to transmit an uplink communication in the slot of the component carrier. In some aspects, the UE may operate in an FD mode with intra-band carrier aggregation. In some aspects, the downlink communication may be associated with a first duplex mode and the uplink communication may be associated with a second duplex mode that is different from the first duplex mode. The UE may cancel, based at least in part on a set of collision mitigation rules, transmitting the uplink communication or receiving the downlink communication.

In some aspects, the set of collision mitigation rules may indicate that the UE is to cancel the transmission of the uplink communication or receiving the downlink communication based at least in part on whether a corresponding slot of a neighboring component carrier is configured to receive a different downlink communication or is configured to transmit a different uplink communication. In some aspects, the set of collision mitigation rules may indicate that the UE is to cancel the transmission of the uplink communication when the corresponding slot of the neighboring component carrier is configured to receive the downlink communication and that the UE is to cancel receiving the downlink communication when the corresponding slot of the neighboring component carrier is configured to transmit the uplink communication. For example, as shown by reference number 710, the set of mitigation rules may indicate that the UE is to align the slot with a direction of a neighboring component carrier (e.g., CC2, as shown).

As shown in FIG. 7A, a corresponding slot in the neighboring component carrier may be configured to receive a downlink communication (e.g., a PDSCH, as shown). The UE may cancel the transmission of the uplink communication based at least in part on the corresponding slot in the neighboring component carrier being configured to receive a downlink communication.

In some aspects, the set of collision mitigation rules may indicate that the UE is to cancel the transmission of the uplink communication or receiving the downlink communication based at least in part on a size of a guard band between the uplink communication and a downlink communication in a corresponding slot of a neighboring component carrier. The set of collision mitigation rules may indicate that the UE is to cancel the transmission of the uplink communication when the guard band is sufficient (e.g., when a size of the guard band satisfies a threshold). The set of collision mitigation rules may indicate that the UE is to cancel receiving the downlink communication when the guard band is insufficient (e.g., when a size of the guard band fails to satisfy the threshold). As shown by reference number 720, the UE may determine that the guard band is insufficient and may cancel the reception of the downlink communication.

As indicated above, FIG. 7 is provided as an example. Other examples may differ from what is described with respect to FIG. 7.

FIG. 8 is a diagram illustrating an example process 800 performed, for example, by a UE, in accordance with the present disclosure. Example process 800 is an example where the UE (e.g., UE 120) performs operations associated with priority and collision handling between semi-static and/or dynamic grant uplink/downlink for full duplex.

As shown in FIG. 8, in some aspects, process 800 may include receiving a first configuration to receive a downlink communication in a set of symbols of a slot via a first duplex mode, wherein the slot is configured as a flexible slot or an FD slot (block 810). For example, the UE (e.g., using communication manager 140 and/or reception component 1102, depicted in FIG. 11) may receive a first configuration to receive a downlink communication in a set of symbols of a slot via a first duplex mode, wherein the slot is configured as a flexible slot or an FD slot, as described above.

As further shown in FIG. 8, in some aspects, process 800 may include receiving a second configuration to transmit an uplink communication in the set of symbols of the slot via a second duplex mode that is different from the first duplex mode, wherein at least one of the first duplex mode or the second duplex mode is an HD mode (block 820). For example, the UE (e.g., using communication manager 140 and/or reception component 1102, depicted in FIG. 11) may receive a second configuration to transmit an uplink communication in the set of symbols of the slot via a second duplex mode that is different from the first duplex mode, wherein at least one of the first duplex mode or the second duplex mode is an HD mode, as described above.

As further shown in FIG. 8, in some aspects, process 800 may include, based at least in part on a set of collision mitigation rules, one or more of: receive the downlink communication in the set of symbols of the slot, or transmit the uplink communication via the set of symbols of the slot (block 830). For example, the UE (e.g., using communication manager 140, reception component 1102, and/or transmission component 1104, depicted in FIG. 11) may, based at least in part on a set of collision mitigation rules, one or more of: receive the downlink communication in the set of symbols of the slot, or transmit the uplink communication via in set of symbols of the slot, as described above.

Process 800 may include additional aspects, such as any single aspect or any combination of aspects described below and/or in connection with one or more other processes described elsewhere herein.

In a first aspect, the set of collision mitigation rules indicates that the UE is to operate in the half duplex mode and that the UE is to cancel one of receiving the downlink communication or transmitting the uplink communication.

In a second aspect, alone or in combination with the first aspect, the set of collision mitigation rules includes a priority rule indicating a priority of the downlink communication relative to a priority of the uplink communication, and where the UE cancels the one of receiving the downlink communication or transmitting the uplink communication based at least in part on the priority rule.

In a third aspect, alone or in combination with one or more of the first and second aspects, the priority rule indicates that transmitting the uplink communication is cancelled when the first duplex mode is a full duplex mode and the second duplex mode is the half duplex mode, and that receiving the downlink communication is cancelled when the first duplex mode is the half duplex mode and the second duplex mode is the full duplex mode.

In a fourth aspect, alone or in combination with one or more of the first through third aspects, the priority rule indicates that transmitting the uplink communication is cancelled when a priority of a signal or a channel associated with the uplink communication is a lower priority relative to a priority of a signal or a channel associated with the downlink communication, and that receiving the downlink communication is cancelled when the priority of the signal or the channel associated with the downlink communication is the lower priority relative to the priority of the signal or the channel associated with the uplink communication.

In a fifth aspect, alone or in combination with one or more of the first through fourth aspects, the priority rule indicates that the UE is to cancel the one of the receiving the downlink communication or the transmitting the uplink communication based at least in part on one or more of a content of the uplink communication, a content of the downlink communication, a time domain behavior associated with the uplink communication, a time domain behavior associated with the downlink communication, a quantity of overlapping signals associated with the uplink communication, or a quantity of overlapping signals associated with the downlink communication.

In a sixth aspect, alone or in combination with one or more of the first through fifth aspects, the first configuration and the second configuration are dynamically granted configurations, and wherein, when a priority associated with the downlink communication is the same as a priority associated with the uplink communication, the set of collision mitigation rules indicates that the UE is to cancel the one of the transmitting the uplink communication or the receiving the downlink communication based at least in part on a time at which the first configuration is received relative to a time at which the second configuration is received.

In a seventh aspect, alone or in combination with one or more of the first through sixth aspects, the set of collision mitigation rules indicates that the UE is to cancel the transmitting the uplink communication when the first configuration is received prior to the second configuration, and that the UE is to cancel the receiving the downlink communication when the second configuration is received prior to the first configuration.

In an eighth aspect, alone or in combination with one or more of the first through seventh aspects, the set of collision mitigation rules indicates that the UE is to cancel the transmitting the uplink communication when the first configuration is received after the second configuration, and that the UE is to cancel the receiving the downlink communication when the second configuration is received after the first configuration.

In a ninth aspect, alone or in combination with one or more of the first through eighth aspects, the first configuration and the second configuration are dynamically granted configurations, and wherein a duplex mode of the slot is determined based at least in part on a time at which the first configuration is received relative to a time at which the second configuration is received.

In a tenth aspect, alone or in combination with one or more of the first through ninth aspects, the set of collision mitigation rules indicates that the UE is to operate in a full duplex mode and is to receive the downlink communication and transmit the uplink communication based at least in part on operating in the full duplex mode.

In an eleventh aspect, alone or in combination with one or more of the first through tenth aspects, the set of collision mitigation rules indicates that the UE is to perform an action, wherein the action includes one or more of performing a power control function associated with transmitting the uplink communication, selecting a new beam for the uplink communication, selecting a new beam pair for the uplink communication and the downlink communication, performing resource allocation rate matching, or performing resource allocation puncturing.

In a twelfth aspect, alone or in combination with one or more of the first through eleventh aspects, the UE performs the action only for the set of symbols in the slot.

In a thirteenth aspect, alone or in combination with one or more of the first through twelfth aspects, the first configuration is a dynamically granted configuration and the second configuration is a semi-static configuration, and wherein, when a priority associated with the downlink communication is the same as a priority associated with the uplink communication, the set of collision mitigation rules indicates that the UE is to cancel the receiving the downlink communication based at least in part on the first configuration being the dynamically granted configuration and the second configuration being the semi-static configuration.

In a fourteenth aspect, alone or in combination with one or more of the first through thirteenth aspects, the set of collision mitigation rules includes a plurality of rules and indicates an order in which the plurality of rules are to be applied.

In a fifteenth aspect, alone or in combination with one or more of the first through fourteenth aspects, the set of collision mitigation rules indicates that the downlink communication is to be cancelled at all frequency resources or that the downlink communication is to be cancelled at only the frequency resources that overlap with the uplink communication or all frequency resources cancelled at only overlapping symbols with the uplink communication.

In a sixteenth aspect, alone or in combination with one or more of the first through fifteenth aspects, the set of collision mitigation rules indicates that the downlink communication is to be cancelled at all frequency resources or that the downlink communication is to be cancelled at only the frequency resources that overlap with the uplink communication based at least in part on a capability of the UE to maintain phase coherency.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a UE, in accordance with the present disclosure. Example process 900 is an example where the UE (e.g., UE 120) performs operations associated with priority and collision handling between semi-static and/or dynamic grant uplink/downlink for full duplex.

As shown in FIG. 9, in some aspects, process 900 may include receiving a first configuration to receive a downlink communication in a slot via an FD mode, a second configuration to transmit a first uplink communication in the slot, and a third configuration to transmit a second uplink communication in the slot, wherein the slot is configured as a flexible slot or an FD slot (block 910). For example, the UE (e.g., using communication manager 140 and/or reception component 1202, depicted in FIG. 12) may receive a first configuration to receive a downlink communication in a slot via an FD mode, a second configuration to transmit a first uplink communication in the slot, and a third configuration to transmit a second uplink communication in the slot, wherein the slot is configured as a flexible slot or an FD slot, as described above.

As further shown in FIG. 9, in some aspects, process 900 may include dropping, based at least in part on a set of collision mitigation rules, transmitting the first uplink communication or transmitting the second uplink communication (block 920). For example, the UE (e.g., using communication manager 140, reception component 1202, and/or transmission component 1204, depicted in FIG. 12) may drop, based at least in part on a set of collision mitigation rules, transmitting the first uplink communication or transmitting the second uplink communication, as described above.

Process 900 may include additional aspects, such as any single aspect or any combination of aspects described below and/or in connection with one or more other processes described elsewhere herein.

In a first aspect, the set of collision mitigation rules indicates that the UE is to determine to drop transmitting the first uplink communication or transmitting the second uplink communication based at least in part on a level of interference between the first uplink communication and the downlink communication and a level of interference between the second uplink communication and the downlink communication.

In a second aspect, alone or in combination with the first aspect, at least one of the level of interference between the first uplink communication and the downlink communication or the level of interference between the second uplink communication and the downlink communication is determined based at least in part on one or more of a quantity of overlapping resource elements between the first uplink communication and the downlink communication relative to a quantity of overlapping resource elements between the second uplink communication and the downlink communication, a size of a guard band between the first uplink communication and the downlink communication relative to a size of a guard band between the second uplink communication and the downlink communication, an uplink power associated with the first uplink communication, an uplink power associated with the second uplink communication, whether a beam associated with the first uplink communication is different from a beam associated with the downlink communication, whether a beam associated with the second uplink communication is different from a beam associated with the downlink communication, or a beam width of a beam associated with the first uplink communication relative to a beam width of a beam associated with the second uplink communication.

In a third aspect, alone or in combination with one or more of the first and second aspects, the set of collision mitigation rules indicates that the UE is to determine to drop the first uplink communication or the second uplink communication based at least in part on a duplex mode associated with the first uplink communication and a duplex mode associated with the second uplink communication.

In a fourth aspect, alone or in combination with one or more of the first through third aspects, the set of collision mitigation rules indicates that an uplink communication associated with a full duplex mode is prioritized over an uplink communication associated with an HD mode.

In a fifth aspect, alone or in combination with one or more of the first through fourth aspects, the set of collision mitigation rules indicates that the UE is to determine to drop the first uplink communication or the second uplink communication based at least in part on a priority associated with the downlink communication.

In a sixth aspect, alone or in combination with one or more of the first through fifth aspects, the set of collision mitigation rules indicates that the UE is to determine to drop the first uplink communication or the second uplink communication based at least in part on whether the second configuration is received prior to the third configuration.

In a seventh aspect, alone or in combination with one or more of the first through sixth aspects, the set of collision mitigation rules indicates that the UE is to determine to drop the first uplink communication or the second uplink communication based at least in part on whether the second configuration is a semi-static configuration or a dynamically generated configuration and whether the third configuration is the semi-static configuration or the dynamically generated configuration.

In an eighth aspect, alone or in combination with one or more of the first through seventh aspects, the set of collision mitigation rules indicates that the UE is to drop the first uplink communication when the first uplink communication is not a retransmission of a prior first uplink communication and the second uplink transmission is a retransmission of a prior second uplink communication.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by a UE, in accordance with the present disclosure. Example process 1000 is an example where the UE (e.g., UE 120) performs operations associated with priority and collision handling between semi-static and/or dynamic grant uplink/downlink for full duplex.

As shown in FIG. 10, in some aspects, process 1000 may include receiving a first configuration to receive a downlink communication in a slot of a component carrier via an FD mode and a second configuration to transmit an uplink communication in the slot of the component carrier, wherein the UE operates in an FD mode with intra-band carrier aggregation, and wherein the downlink communication is associated with a first duplex mode and the uplink communication is associated with a second duplex mode that is different from the first duplex mode (block 1010). For example, the UE (e.g., using communication manager 140 and/or reception component 1302, depicted in FIG. 13) may receive a first configuration to receive a downlink communication in a slot of a component carrier via an FD mode and a second configuration to transmit an uplink communication in the slot of the component carrier, wherein the UE operates in an FD mode with intra-band carrier aggregation, and wherein the downlink communication is associated with a first duplex mode and the uplink communication is associated with a second duplex mode that is different from the first duplex mode, as described above.

As further shown in FIG. 10, in some aspects, process 1000 may include dropping, based at least in part on a set of collision mitigation rules, transmitting the uplink communication or receiving the downlink communication, wherein the UE operates in an HD mode in the component carrier to transmit the uplink communication when receiving the downlink communication is dropped or to receive the downlink communication when transmitting the uplink communication is dropped (block 1020). For example, the UE (e.g., using communication manager 140, reception component 1302, and/or transmission component 1304, depicted in FIG. 13) may drop, based at least in part on a set of collision mitigation rules, transmitting the uplink communication or receiving the downlink communication, wherein the UE operates in an HD mode in the component carrier to transmit the uplink communication when receiving the downlink communication is dropped or to receive the downlink communication when transmitting the uplink communication is dropped, as described above.

Process 1000 may include additional aspects, such as any single aspect or any combination of aspects described below and/or in connection with one or more other processes described elsewhere herein.

In a first aspect, the set of collision mitigation rules indicates that the UE is to drop transmitting the uplink communication or receiving the downlink communication based at least in part on whether a corresponding slot of a neighboring component carrier is configured to receive a different downlink communication or to transmit a different uplink communication.

In a second aspect, alone or in combination with the first aspect, the set of collision mitigation rules indicates that the UE is to drop transmitting the uplink communication when the corresponding slot of the neighboring component carrier is configured to receive the downlink communication and that the UE is to drop receiving the downlink communication when the corresponding slot of the neighboring component carrier is configured to transmit the uplink communication.

In a third aspect, alone or in combination with one or more of the first and second aspects, the set of collision mitigation rules indicates that the UE is to drop transmitting the uplink communication or receiving the downlink communication based at least in part on a size of a guard band between the uplink communication and a downlink communication in a corresponding slot of a neighboring component carrier.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
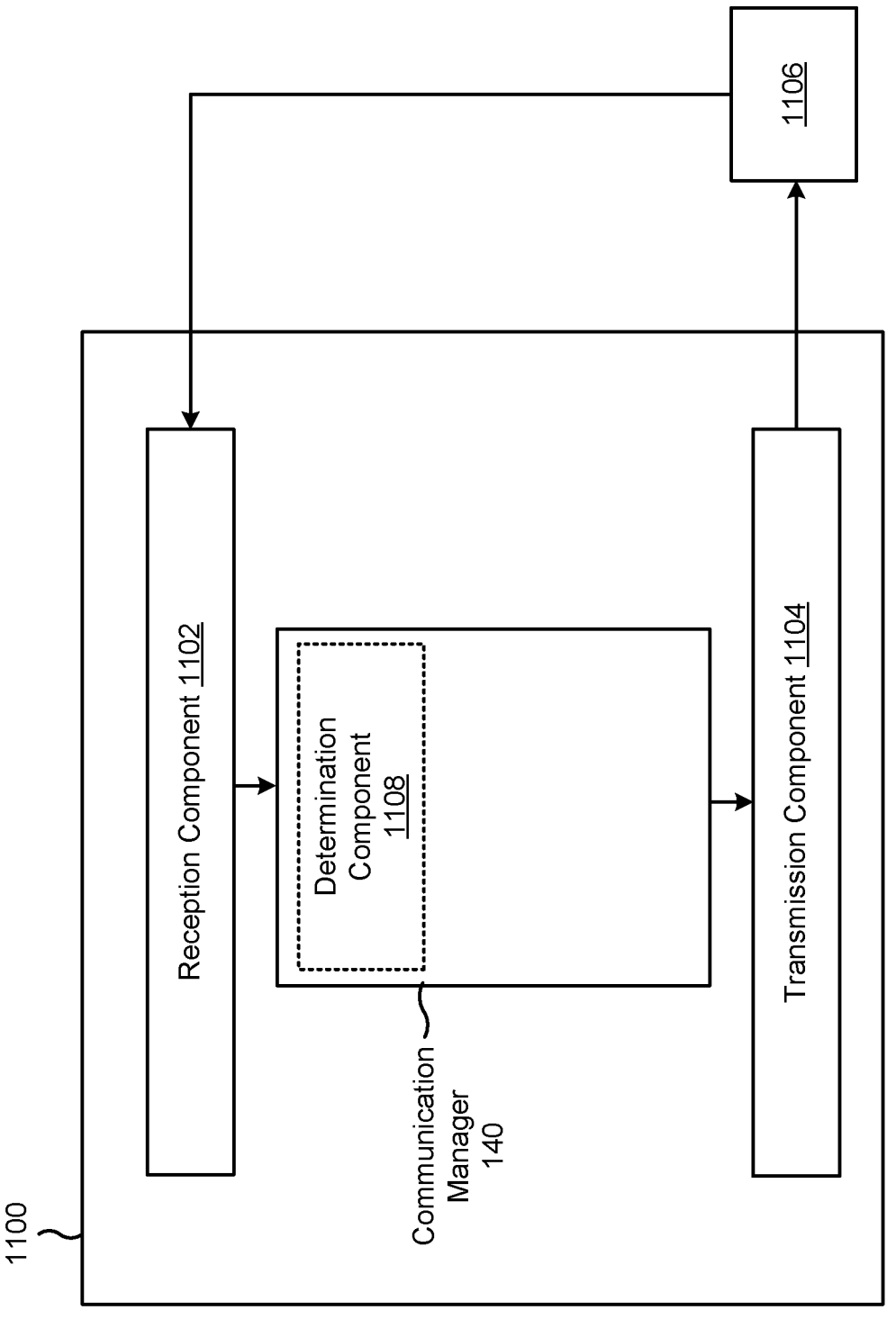
FIGS. 11-13 are diagrams of example apparatuses for wireless communication, in accordance with the present disclosure.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include a determination component 1108, among other examples.

In some aspects, the apparatus 1100 may be configured to perform one or more operations described herein in connection with FIGS. 6A-6E and 7. Additionally, or alternatively, the apparatus 1100 may be configured to perform one or more processes described herein, such as process 800 of FIG. 8. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive a first configuration to receive a downlink communication in a set of symbols of a slot via a first duplex mode, wherein the slot is configured as a flexible slot or an FD slot. The reception component 1102 may receive a second configuration to transmit an uplink communication in the set of symbols of the slot via a second duplex mode that is different from the first duplex mode, wherein at least one of the first duplex mode or the second duplex mode is HD mode. The determination component 1108 may, based at least in part on a set of collision mitigation rules, determine to receive the downlink communication in the set of symbols of the slot and/or transmit the uplink communication via in set of symbols of the slot.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
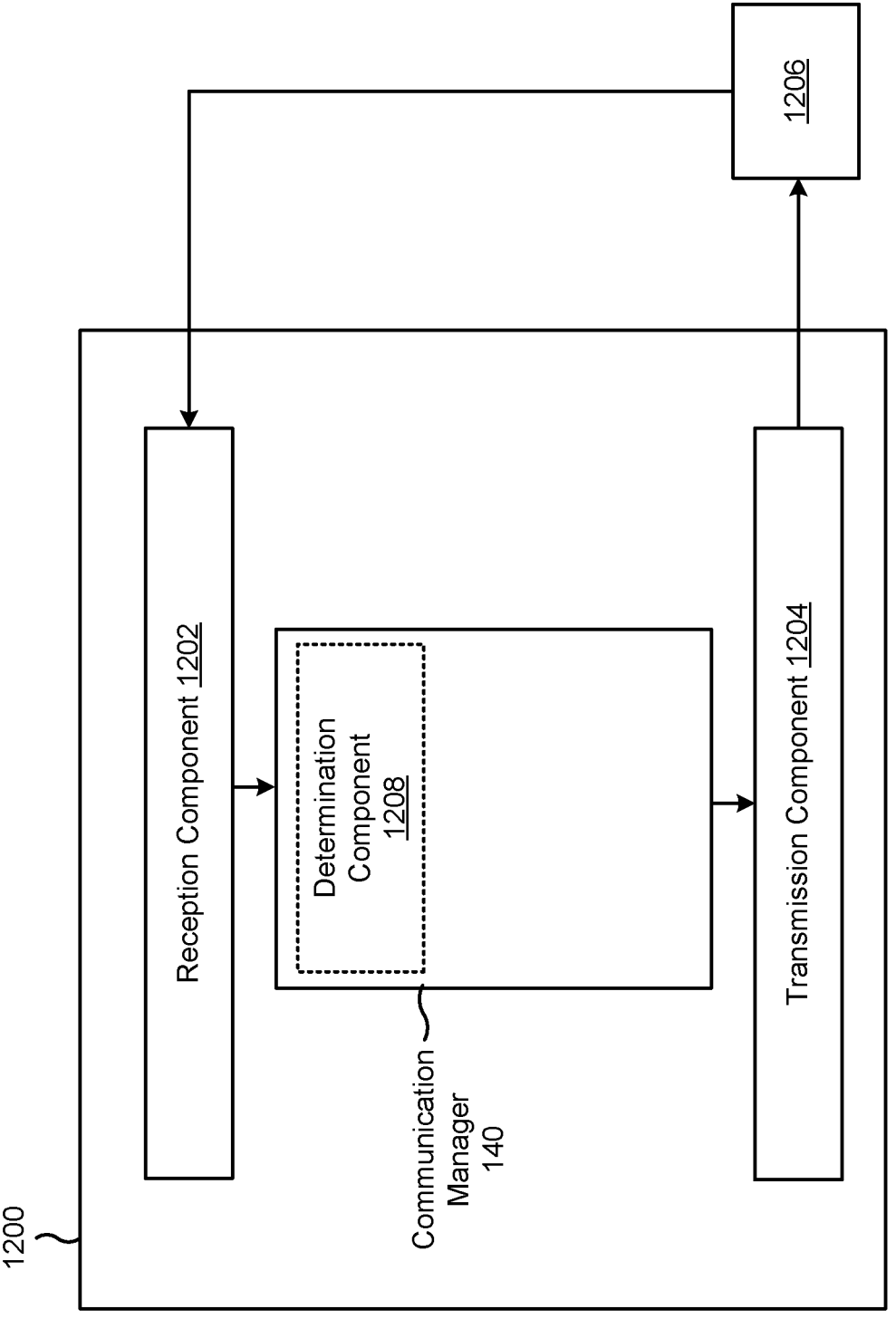

FIG. 12 is a diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include a determination component 1208, among other examples.

In some aspects, the apparatus 1200 may be configured to perform one or more operations described herein in connection with FIGS. 6A-6E and 7. Additionally, or alternatively, the apparatus 1200 may be configured to perform one or more processes described herein, such as process 900 of FIG. 9. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The reception component 1202 may receive a first configuration to receive a downlink communication in a slot via a full duplex mode, a second configuration to transmit a first uplink communication in the slot, and a third configuration to transmit a second uplink communication in the slot, wherein the slot is configured as a flexible slot or a full duplex slot. The determination component 1208 may determine to drop (e.g., cancel), based at least in part on a set of collision mitigation rules, transmitting the first uplink communication or transmitting the second uplink communication.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
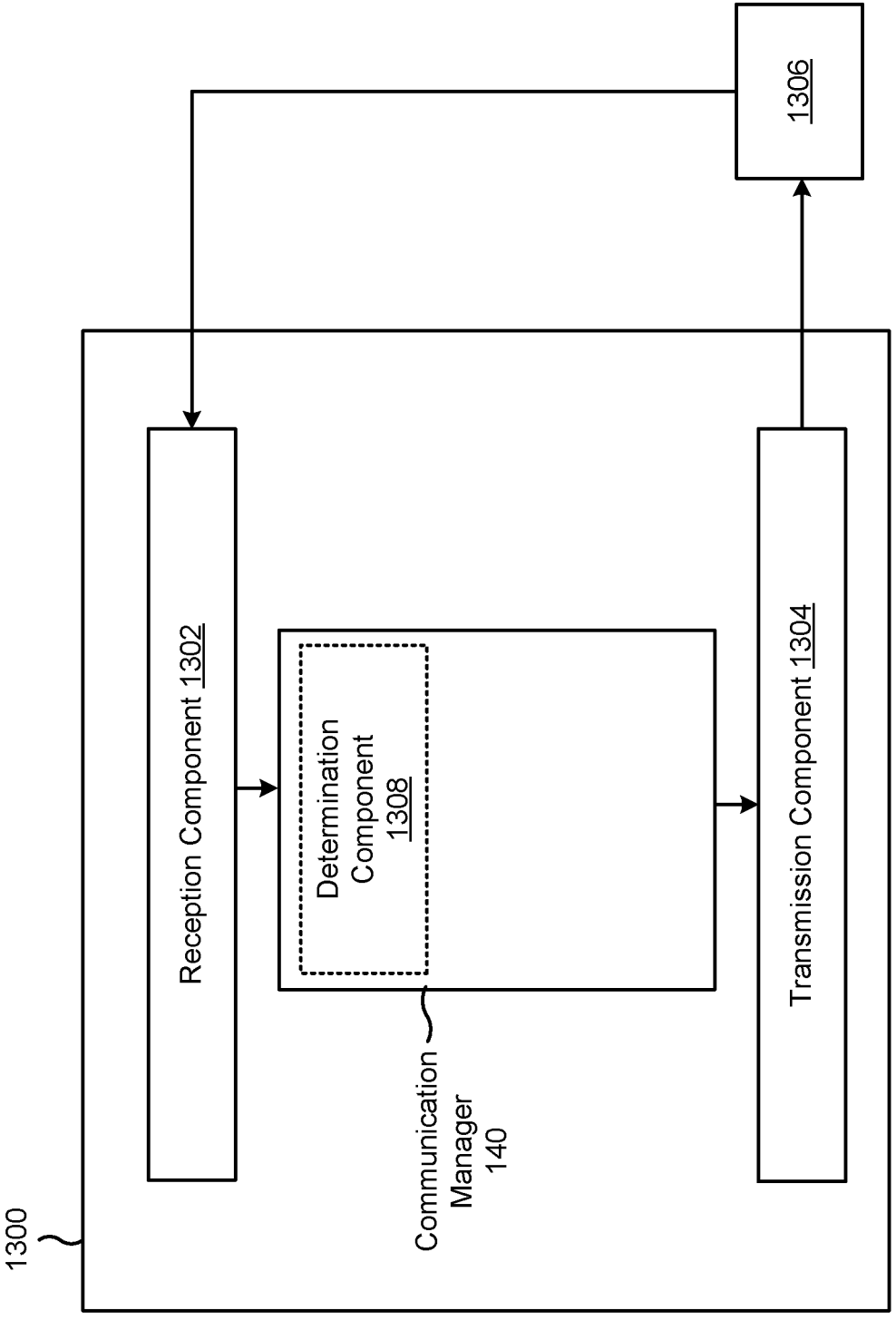

FIG. 13 is a diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 140. The communication manager 140 may include a determination component 1308, among other examples.

In some aspects, the apparatus 1300 may be configured to perform one or more operations described herein in connection with FIGS. 6A-6E and 7. Additionally, or alternatively, the apparatus 1300 may be configured to perform one or more processes described herein, such as process 1000 of FIG. 10. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The reception component 1302 may receive a first configuration to receive a downlink communication in a slot of a component carrier via an FD mode and a second configuration to transmit an uplink communication in the slot of the component carrier, wherein the UE operates in an FD mode with intra-band carrier aggregation, and wherein the downlink communication is associated with a first duplex mode and the uplink communication is associated with a second duplex mode that is different from the first duplex mode. The determination component 1308 may determine to drop (e.g., cancel), based at least in part on a set of collision mitigation rules, transmitting the uplink communication or receiving the downlink communication, wherein the UE operates in an HD mode in the component carrier to transmit the uplink communication when receiving the downlink communication is dropped or to receive the downlink communication when transmitting the uplink communication is dropped.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a UE, comprising: receiving a first configuration to receive a downlink communication in a set of symbols of a slot via a first duplex mode, wherein the slot is configured as a flexible slot or an FD slot; receiving a second configuration to transmit an uplink communication in the set of symbols of the slot via a second duplex mode that is different from the first duplex mode, wherein at least one of the first duplex mode or the second duplex mode is an HD mode; and based at least in part on a set of collision mitigation rules, one or more of: receiving the downlink communication in the set of symbols of the slot, or transmitting the uplink communication via in set of symbols of the slot.

Aspect 2: The method of Aspect 1, wherein the set of collision mitigation rules indicates that the UE is to operate in the HD mode and that the UE is to cancel one of receiving the downlink communication or transmitting the uplink communication.

Aspect 3: The method of Aspect 2, wherein the set of collision mitigation rules includes a priority rule indicating a priority of the downlink communication relative to a priority of the uplink communication, and where the UE cancels the one of receiving the downlink communication or transmitting the uplink communication based at least in part on the priority rule.

Aspect 4: The method of Aspect 3, wherein the priority rule indicates that transmitting the uplink communication is cancelled when the first duplex mode is an FD mode and the second duplex mode is the HD mode, and that receiving the downlink communication is cancelled when the first duplex mode is the HD mode and the second duplex mode is the FD mode.

Aspect 5: The method of Aspect 3, wherein the priority rule indicates that transmitting the uplink communication is cancelled when a priority of a signal or a channel associated with the uplink communication is a lower priority relative to a priority of a signal or a channel associated with the downlink communication, and that receiving the downlink communication is cancelled when the priority of the signal or the channel associated with the downlink communication is the lower priority relative to the priority of the signal or the channel associated with the uplink communication.

Aspect 6: The method of Aspect 3, wherein the priority rule indicates that the UE is to cancel the one of the receiving the downlink communication or the transmitting the uplink communication based at least in part on one or more of: a content of the uplink communication, a content of the downlink communication, a time domain behavior associated with the uplink communication, a time domain behavior associated with the downlink communication, a quantity of overlapping signals associated with the uplink communication, or a quantity of overlapping signals associated with the downlink communication.

Aspect 7: The method of one or more of Aspects 1 through 6, wherein the first configuration and the second configuration are dynamically granted configurations, and wherein, when a priority associated with the downlink communication is the same as a priority associated with the uplink communication, the set of collision mitigation rules indicates that the UE is to cancel the one of the transmitting the uplink communication or the receiving the downlink communication based at least in part on a time at which the first configuration is received relative to a time at which the second configuration is received.

Aspect 8: The method of Aspect 7, wherein the set of collision mitigation rules indicates that the UE is to cancel the transmitting the uplink communication when the first configuration is received prior to the second configuration, and that the UE is to cancel the receiving the downlink communication when the second configuration is received prior to the first configuration.

Aspect 9: The method of Aspect 7, wherein the set of collision mitigation rules indicates that the UE is to cancel the transmitting the uplink communication when the first configuration is received after the second configuration, and that the UE is to cancel the receiving the downlink communication when the second configuration is received after the first configuration.

Aspect 10: The method of one or more of Aspects 1 through 9, wherein the first configuration and the second configuration are dynamically granted configurations, and wherein a duplex mode of the slot is determined based at least in part on a time at which the first configuration is received relative to a time at which the second configuration is received.

Aspect 11: The method of one or more of Aspects 1 through 10, wherein the set of collision mitigation rules indicates that the UE is to operate in an FD mode and is to receive the downlink communication and transmit the uplink communication based at least in part on operating in the FD mode.

Aspect 12: The method of Aspect 11, wherein the set of collision mitigation rules indicates that the UE is to perform an action, wherein the action includes one or more of: perform a power control function associated with transmitting the uplink communication, select a new beam for the uplink communication, select a new beam pair for the uplink communication and the downlink communication, perform resource allocation rate matching, or perform resource allocation puncturing.

Aspect 13: The method of Aspect 12, wherein the UE performs the action only for the set of symbols in the slot.

Aspect 14: The method of one or more of Aspects 1 through 13, wherein the first configuration is a dynamically granted configuration and the second configuration is a semi-static configuration, and wherein, when a priority associated with the downlink communication is the same as a priority associated with the uplink communication, the set of collision mitigation rules indicates that the UE is to cancel the receiving the downlink communication based at least in part on the first configuration being the dynamically granted configuration and the second configuration being the semi-static configuration.

Aspect 15: The method of one or more of Aspects 1 through 14, wherein the set of collision mitigation rules includes a plurality of rules and an order in which the plurality of rules are to be applied.

Aspect 16: The method of one or more of Aspects 1 through 15, wherein the set of collision mitigation rules indicates that the downlink communication is to be cancelled at all frequency resources or that the downlink communication is to be cancelled at only the frequency resources that overlap with the uplink communication or all frequency resources cancelled at only overlapping symbols with the uplink communication.

Aspect 17: The method of Aspect 16, wherein the set of collision mitigation rules indicates that the downlink communication is to be cancelled at all frequency resources or that the downlink communication is to be cancelled at only the frequency resources that overlap with the uplink communication based at least in part on a capability of the UE to maintain phase coherency.

Aspect 18: A method of wireless communication performed by a UE, comprising: receiving a first configuration to receive a downlink communication in a slot via an FD mode, a second configuration to transmit a first uplink communication in the slot, and a third configuration to transmit a second uplink communication in the slot, wherein the slot is configured as a flexible slot or an FD slot; and dropping, based at least in part on a set of collision mitigation rules, transmitting the first uplink communication or transmitting the second uplink communication.

Aspect 19: The method of Aspect 18, wherein the set of collision mitigation rules indicates that the UE is to determine to drop transmitting the first uplink communication or transmitting the second uplink communication based at least in part on a level of interference between the first uplink communication and the downlink communication and a level of interference between the second uplink communication and the downlink communication.

Aspect 20: The method of Aspect 19, wherein at least one of the level of interference between the first uplink communication and the downlink communication or the level of interference between the second uplink communication and the downlink communication is determined based at least in part on one or more of: a quantity of overlapping resource elements between the first uplink communication and the downlink communication relative to a quantity of overlapping resource elements between the second uplink communication and the downlink communication, a size of a guard band between the first uplink communication and the downlink communication relative to a size of a guard band between the second uplink communication and the downlink communication, an uplink power associated with the first uplink communication, an uplink power associated with the second uplink communication, whether a beam associated with the first uplink communication is different from a beam associated with the downlink communication, whether a beam associated with the second uplink communication is different from a beam associated with the downlink communication, or a beam width of a beam associated with the first uplink communication relative to a beam width of a beam associated with the second uplink communication.

Aspect 21: The method of one or more of Aspects 18 through 20, wherein the set of collision mitigation rules indicates that the UE is to determine to drop the first uplink communication or the second uplink communication based at least in part on a duplex mode associated with the first uplink communication and a duplex mode associated with the second uplink communication.

Aspect 22: The method of Aspect 21, wherein the set of collision mitigation rules indicates that an uplink communication associated with an FD mode is prioritized over an uplink communication associated with an HD mode.

Aspect 23: The method of one or more of Aspects 18 through 22, wherein the set of collision mitigation rules indicates that the UE is to determine to drop the first uplink communication or the second uplink communication based at least in part on a priority associated with the downlink communication.

Aspect 24: The method of one or more of Aspects 18 through 23, wherein the set of collision mitigation rules indicates that the UE is to determine to drop the first uplink communication or the second uplink communication based at least in part on whether the second configuration is received prior to the third configuration.

Aspect 25: The method of one or more of Aspects 18 through 24, wherein the set of collision mitigation rules indicates that the UE is to determine to drop the first uplink communication or the second uplink communication based at least in part on whether the second configuration is a semi-static configuration or a dynamically generated configuration and whether the third configuration is the semi-static configuration or the dynamically generated configuration.

Aspect 26: The method of one or more of Aspects 18 through 25, wherein the set of collision mitigation rules indicates that the UE is to drop the first uplink communication when the first uplink communication is not a retransmission of a prior first uplink communication and the second uplink transmission is a retransmission of a prior second uplink communication.

Aspect 27: A method of wireless communication performed by a UE, comprising: receiving a first configuration to receive a downlink communication in a slot of a component carrier via an FD mode and a second configuration to transmit an uplink communication in the slot of the component carrier, wherein the UE operates in an FD mode with intra-band carrier aggregation, and wherein the downlink communication is associated with a first duplex mode and the uplink communication is associated with a second duplex mode that is different from the first duplex mode; and dropping, based at least in part on a set of collision mitigation rules, transmitting the uplink communication or receiving the downlink communication, wherein the UE operates in an HD mode in the component carrier to transmit the uplink communication when receiving the downlink communication is dropped or to receive the downlink communication when transmitting the uplink communication is dropped.

Aspect 28: The method of Aspect 27, wherein the set of collision mitigation rules indicates that the UE is to drop transmitting the uplink communication or receiving the downlink communication based at least in part on whether a corresponding slot of a neighboring component carrier is configured to receive a different downlink communication or to transmit a different uplink communication.

Aspect 29: The method of Aspect 28, wherein the set of collision mitigation rules indicates that the UE is to drop transmitting the uplink communication when the corresponding slot of the neighboring component carrier is configured to receive the downlink communication and that the UE is to drop receiving the downlink communication when the corresponding slot of the neighboring component carrier is configured to transmit the uplink communication.

Aspect 30: The method of one or more of Aspects 27 through 29, wherein the set of collision mitigation rules indicates that the UE is to drop transmitting the uplink communication or receiving the downlink communication based at least in part on a size of a guard band between the uplink communication and a downlink communication in a corresponding slot of a neighboring component carrier.

Aspect 31: An apparatus for wireless communication at a device, comprising a processor; memory coupled with the processor; and instructions stored in the memory and executable by the processor to cause the apparatus to perform the method of one or more of Aspects 1 through 17.

Aspect 32: A device for wireless communication, comprising a memory and one or more processors coupled to the memory, the one or more processors configured to perform the method of one or more of Aspects 1 through 17.

Aspect 33: An apparatus for wireless communication, comprising at least one means for performing the method of one or more of Aspects 1 through 17.

Aspect 34: A non-transitory computer-readable medium storing code for wireless communication, the code comprising instructions executable by a processor to perform the method of one or more of Aspects 1 through 17.

Aspect 35: A non-transitory computer-readable medium storing a set of instructions for wireless communication, the set of instructions comprising one or more instructions that, when executed by one or more processors of a device, cause the device to perform the method of one or more of Aspects 1 through 17.

Aspect 36: An apparatus for wireless communication at a device, comprising a processor; memory coupled with the processor; and instructions stored in the memory and executable by the processor to cause the apparatus to perform the method of one or more of Aspects 18 through 26.

Aspect 37: A device for wireless communication, comprising a memory and one or more processors coupled to the memory, the one or more processors configured to perform the method of one or more of Aspects 18 through 26.

Aspect 38: An apparatus for wireless communication, comprising at least one means for performing the method of one or more of Aspects 18 through 26.

Aspect 39: A non-transitory computer-readable medium storing code for wireless communication, the code comprising instructions executable by a processor to perform the method of one or more of Aspects 18 through 26.

Aspect 40: A non-transitory computer-readable medium storing a set of instructions for wireless communication, the set of instructions comprising one or more instructions that, when executed by one or more processors of a device, cause the device to perform the method of one or more of Aspects 18 through 26.

Aspect 41: An apparatus for wireless communication at a device, comprising a processor; memory coupled with the processor; and instructions stored in the memory and executable by the processor to cause the apparatus to perform the method of one or more of Aspects 27 through 30.

Aspect 42: A device for wireless communication, comprising a memory and one or more processors coupled to the memory, the one or more processors configured to perform the method of one or more of Aspects 27 through 30.

Aspect 43: An apparatus for wireless communication, comprising at least one means for performing the method of one or more of Aspects 27 through 30.

Aspect 44: A non-transitory computer-readable medium storing code for wireless communication, the code comprising instructions executable by a processor to perform the method of one or more of Aspects 27 through 30.

Aspect 45: A non-transitory computer-readable medium storing a set of instructions for wireless communication, the set of instructions comprising one or more instructions that, when executed by one or more processors of a device, cause the device to perform the method of one or more of Aspects 27 through 30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and one or more processors, coupled to the one or more memories, configured to:

receive a first configuration to receive a downlink communication in a set of symbols of a slot via a first duplex mode, wherein the slot is configured as a flexible slot or a full duplex slot;

receive a second configuration to transmit an uplink communication in the set of symbols of the slot via a second duplex mode that is different from the first duplex mode, wherein at least one of the first duplex mode or the second duplex mode is a half duplex mode; and perform one or more communications in the set of symbols of the slot based at least in part on a set of collision mitigation rules, wherein:

the set of collision mitigation rules includes a priority rule indicating a priority of the first duplex mode of the downlink communication relative to a priority of the second duplex mode of the uplink communication, and the one or more communications include one or more of:

reception of the downlink communication in the set of symbols of the slot, or transmission of the uplink communication via the set of symbols of the slot.

2. The UE of claim 1, wherein the set of collision mitigation rules indicates:

the UE is to operate in the half duplex mode, and the UE is to cancel one of the reception of the downlink communication or the transmission of the uplink communication.

3. The UE of claim 2, wherein:

the set of collision mitigation rules includes a second priority rule indicating a priority of the downlink communication relative to a priority of the uplink communication, and the set of collision mitigation rules indicates that the UE is to cancel the one of the reception of the downlink communication or the transmission of the uplink communication based at least in part on the second priority rule.

4. The UE of claim 1, wherein the priority rule indicates:

the transmission of the uplink communication is cancelled when the first duplex mode is a full duplex mode and the second duplex mode is the half duplex mode, and the reception of the downlink communication is cancelled when the first duplex mode is the half duplex mode and the second duplex mode is the full duplex mode.

5. The UE of claim 3, wherein the second priority rule indicates:

the transmission of the uplink communication is cancelled when a priority of a signal or a channel associated with the uplink communication is a lower priority relative to a priority of a signal or a channel associated with the downlink communication, and the reception of the downlink communication is cancelled when the priority of the signal or the channel associated with the downlink communication is the lower priority relative to the priority of the signal or the channel associated with the uplink communication.

6. The UE of claim 3, wherein the second priority rule indicates that the UE is to cancel the one of the reception of the downlink communication or the transmission of the uplink communication based at least in part on one or more of:

a content of the uplink communication, a content of the downlink communication, a time domain behavior associated with the uplink communication, a time domain behavior associated with the downlink communication, a quantity of overlapping signals associated with the uplink communication, or a quantity of overlapping signals associated with the downlink communication.

7. The UE of claim 1, wherein;

the first configuration and the second configuration are dynamically granted configurations, and when a priority associated with the downlink communication is the same as a priority associated with the uplink communication, the set of collision mitigation rules indicates that the UE is to cancel the one of the transmission of the uplink communication or the reception of the downlink communication based at least in part on a time at which the first configuration is received relative to a time at which the second configuration is received.

8. The UE of claim 7, wherein the set of collision mitigation rules indicates:

the UE is to cancel the transmission of the uplink communication when the first configuration is received prior to the second configuration, and the UE is to cancel the reception of the downlink communication when the second configuration is received prior to the first configuration.

9. The UE of claim 7, wherein the set of collision mitigation rules indicates:

the UE is to cancel the transmission of the uplink communication when the first configuration is received after the second configuration, and the UE is to cancel the reception of the downlink communication when the second configuration is received after the first configuration.

10. The UE of claim 1, wherein:

the first configuration and the second configuration are dynamically granted configurations, and a duplex mode of the slot is determined based at least in part on a time at which the first configuration is received relative to a time at which the second configuration is received.

11. The UE of claim 1, wherein the set of collision mitigation rules indicates that the UE is to operate in a full duplex mode and is to receive the downlink communication and transmit the uplink communication based at least in part on operating in the full duplex mode.

12. The UE of claim 11, wherein the set of collision mitigation rules indicates that the UE is to perform an action, and wherein the action includes one or more of:

performance of a power control function associated with the transmission of the uplink communication, selection of a new beam for the uplink communication, selection of a new beam pair for the uplink communication and the downlink communication, performance of resource allocation rate matching, or performance of resource allocation puncturing.

13. The UE of claim 12, wherein the set of collision mitigation rules indicates that the UE is to perform the action only for the set of symbols in the slot.

14. The UE of claim 1, wherein;

the first configuration is a dynamically granted configuration and the second configuration is a semi-static configuration, and when a priority associated with the downlink communication is the same as a priority associated with the uplink communication, the set of collision mitigation rules indicates that the UE is to cancel the reception of the downlink communication based at least in part on the first configuration being the dynamically granted configuration and the second configuration being the semi-static configuration.

15. The UE of claim 1, wherein the set of collision mitigation rules includes a plurality of rules and an order in which the plurality of rules are to be applied.

16. The UE of claim 1, wherein the set of collision mitigation rules indicates: that the downlink communication is to be cancelled at all frequency resources, or the downlink communication is to be cancelled at only the frequency resources that overlap with the uplink communication or all frequency resources cancelled at only overlapping symbols with the uplink communication.

17. The UE of claim 1, wherein the set of collision mitigation rules indicates:

the downlink communication is to be cancelled at all frequency resources, or the downlink communication is to be cancelled at only the frequency resources that overlap with the uplink communication based at least in part on a capability of the UE to maintain phase coherency.

18. A user equipment (UE) for wireless communication, comprising:

one or more memories; and one or more processors, coupled to the one or more memories, configured to:

receive a first configuration for reception of a downlink communication in a slot of a component carrier via a full duplex mode and a second configuration for transmission of an uplink communication in the slot of the component carrier, wherein the UE operates in a full duplex mode with intra-band carrier aggregation, and wherein the downlink communication is associated with a first duplex mode and the uplink communication is associated with a second duplex mode that is different from the first duplex mode; and drop, based at least in part on a set of collision mitigation rules, the transmission of the uplink communication or the reception of the downlink communication, wherein:

the set of collision mitigation rules includes a priority rule indicating a priority of the first duplex mode of the downlink communication relative to a priority of the second duplex mode of the uplink communication, and the UE operates in a half duplex mode in the component carrier to transmit the uplink communication when the reception of the downlink communication is dropped or to receive the downlink communication when the transmission of the uplink communication is dropped.

19. The UE of claim 18, wherein the set of collision mitigation rules indicates that the UE is to drop the transmission of the uplink communication or the reception of the downlink communication based at least in part on whether a corresponding slot of a neighboring component carrier is configured to receive a different downlink communication or to transmit a different uplink communication.

20. The UE of claim 19, wherein the set of collision mitigation rules indicates:

the UE is to drop the transmission of the uplink communication when the corresponding slot of the neighboring component carrier is configured to receive the downlink communication, and the UE is to drop the reception of the downlink communication when the corresponding slot of the neighboring component carrier is configured to transmit the uplink communication.

21. The UE of claim 18, wherein the set of collision mitigation rules indicates that the UE is to drop the transmission of the uplink communication or the reception of the downlink communication based at least in part on a size of a guard band between the uplink communication and a downlink communication in a corresponding slot of a neighboring component carrier.

22. A method of wireless communication performed by a user equipment (UE), comprising:

receiving a first configuration to receive a downlink communication in a set of symbols of a slot via a first duplex mode, wherein the slot is configured as a flexible slot or a full duplex slot;

receiving a second configuration to transmit an uplink communication in the set of symbols of the slot via a second duplex mode that is different from the first duplex mode, wherein at least one of the first duplex mode or the second duplex mode is a half duplex mode; and performing one or more communications in the set of symbols of the slot based at least in part on a set of collision mitigation rules, wherein:

the set of collision mitigation rules includes a priority rule indicating a priority of the first duplex mode of the downlink communication relative to a priority of the second duplex mode of the uplink communication, and the one or more communications include one or more of:

reception of the downlink communication in the set of symbols of the slot, or transmission of the uplink communication via the set of symbols of the slot.

23. The method of claim 22, wherein the set of collision mitigation rules indicates:

the UE is to operate in the half duplex mode, and the UE is to cancel one of the reception of the downlink communication or the transmission of the uplink communication.

24. The method of claim 23, wherein:

the set of collision mitigation rules includes a second priority rule indicating a priority of the downlink communication relative to a priority of the uplink communication, and the set of collision mitigation rules indicates that the UE is to cancel the one of the reception of the downlink communication or the transmission of the uplink communication based at least in part on the priority rule.

25. The method of claim 22, wherein the priority rule indicates:

the transmission of the uplink communication is cancelled when the first duplex mode is a full duplex mode and the second duplex mode is the half duplex mode, and the reception of the downlink communication is cancelled when the first duplex mode is the half duplex mode and the second duplex mode is the full duplex mode.

26. The method of claim 24, wherein the second priority rule indicates:

the transmission of the uplink communication is cancelled when a priority of a signal or a channel associated with the uplink communication is a lower priority relative to a priority of a signal or a channel associated with the downlink communication, and the reception of the downlink communication is cancelled when the priority of the signal or the channel associated with the downlink communication is the lower priority relative to the priority of the signal or the channel associated with the uplink communication.

27. The method of claim 24, wherein the second priority rule indicates that the UE is to cancel the one of the reception of the downlink communication or the transmission of the uplink communication based at least in part on one or more of:

a content of the uplink communication, a content of the downlink communication, a time domain behavior associated with the uplink communication, a time domain behavior associated with the downlink communication, a quantity of overlapping signals associated with the uplink communication, or a quantity of overlapping signals associated with the downlink communication.

28. The method of claim 22, wherein;

the first configuration and the second configuration are dynamically granted configurations, and when a priority associated with the downlink communication is the same as a priority associated with the uplink communication, the set of collision mitigation rules indicates that the UE is to cancel the one of the transmission of the uplink communication or the reception of the downlink communication based at least in part on a time at which the first configuration is received relative to a time at which the second configuration is received.

29. The method of claim 28, wherein the set of collision mitigation rules indicates:

the UE is to cancel the transmission of the uplink communication when the first configuration is received prior to the second configuration, and the UE is to cancel the reception of the downlink communication when the second configuration is received prior to the first configuration.

30. The method of claim 28, wherein the set of collision mitigation rules indicates:

the UE is to cancel the transmission of the uplink communication when the first configuration is received after the second configuration, and the UE is to cancel the reception of the downlink communication when the second configuration is received after the first configuration.

* * * * *